(12) United States Patent
Okada et al.

(10) Patent No.: US 8,019,197 B2
(45) Date of Patent: Sep. 13, 2011

(54) RECORDING/REPRODUCTION DEVICE

(75) Inventors: Takanori Okada, Toyonaka (JP);
Masafumi Shimotashiro, Katano (JP);
Yoshiho Gotoh, Osaka (JP); Tatsushi Bannai, Sakai (JP)

(73) Assignee: Panasonic Corporation, Osaka (JP)

( * ) Notice: Subject to any disclaimer, the term of this patent is extended or adjusted under 35 U.S.C. 154(b) by 1128 days.

(21) Appl. No.: 10/544,233

(22) PCT Filed: Nov. 28, 2003

(86) PCT No.: PCT/JP03/15205
§ 371 (c)(1),
(2), (4) Date: Aug. 2, 2005

(87) PCT Pub. No.: WO2004/071083
PCT Pub. Date: Aug. 19, 2004

(65) Prior Publication Data
US 2006/0140593 A1    Jun. 29, 2006

(30) Foreign Application Priority Data

Feb. 5, 2003 (JP) ................. 2003-028016
Sep. 8, 2003 (JP) ................. 2003-315416

(51) Int. Cl.
*H04N 9/80* (2006.01)
*H04N 5/93* (2006.01)
*G11B 27/00* (2006.01)

(52) U.S. Cl. ........ 386/248; 386/239; 386/278; 386/280; 386/285; 386/287

(58) Field of Classification Search ............... 386/1, 46, 386/52–55, 121, 94, 95, 96, 45, 111–112, 386/124–126, 239, 248, 278, 280, 285, 287; 360/48; 370/535
See application file for complete search history.

(56) References Cited

U.S. PATENT DOCUMENTS

| | | | |
|---|---|---|---|
| 6,178,147 B1 | 1/2001 | Fujinami | |
| 6,219,311 B1 | 4/2001 | Mitsuno | |
| 6,295,409 B1 | 9/2001 | Ikeda | |
| 6,453,113 B1 | 9/2002 | Sakai et al. | |
| 2002/0081101 A1 | 6/2002 | Taira et al. | |
| 2005/0013583 A1* | 1/2005 | Itoh | ................. 386/1 |

FOREIGN PATENT DOCUMENTS

| | | |
|---|---|---|
| EP | 0 949 825 | 10/1999 |
| EP | 1 087 392 | 3/2001 |
| JP | 11-144383 | 5/1999 |
| JP | 11-213564 | 8/1999 |
| JP | 11-259992 | 9/1999 |
| JP | 2002-112198 | 4/2002 |
| JP | 2003-9091 | 1/2003 |

* cited by examiner

*Primary Examiner* — Thai Tran
*Assistant Examiner* — Daquan Zhao
(74) *Attorney, Agent, or Firm* — Hamre, Schumann, Mueller & Larson, P.C.

(57) ABSTRACT

The present invention provides a recording/reproduction device that can perform post-record editing on a disk on which post-record editing has been determined to be impossible by conventional methods, and that can reproduce data that thus has been subjected to post-record editing, by devising a method for access in one cycle of repetitive processes of post-record editing. The recording/reproduction device is provided with a pick-up for recording or reproducing information and a control portion for controlling an operation of the pick-up, in which when reproduction is performed from an information recording medium on which in a separate area from a main sequence in which data blocks including original audio data and video data are recorded in succession, an additional sequence in which data blocks including post-record audio data are recorded in succession is formed, the control portion controls an operation of the pick-up in such a manner that the pick-up accesses the main sequence and the additional sequence alternately, and reproduces a plurality of data blocks in succession in each access.

2 Claims, 16 Drawing Sheets

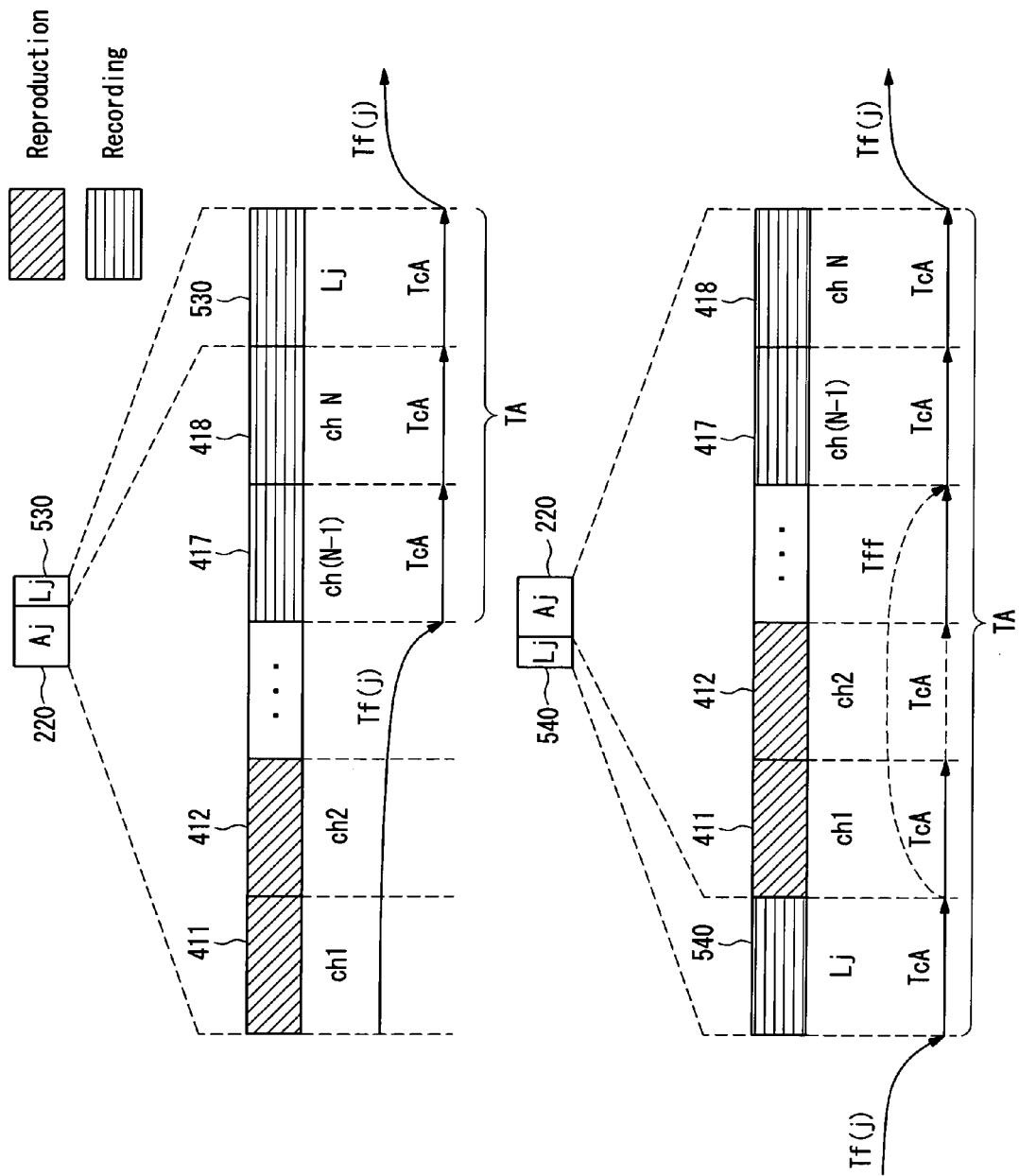

RECORDING/REPRODUCTION DEVICE

TECHNICAL FIELD

The present invention relates to an information recording medium that records/reproduces real-time data onto/from it. In particular, the present invention relates to a recording/reproduction device that can perform post-record editing and recording on an information recording medium and perform reproduction from the information recording medium on which post-record editing and recording have been performed.

BACKGROUND ART

There are optical disks as information recording media having a sector structure. Recently, as media come to have higher density and larger capacity, recording, reproduction, and editing of real-time data including audio data or video data are performed in more applications.

As one form of editing, there is an editing technique that is referred to as "post-record (after-record) editing." Post-record editing is an editing technique in which data already having been recorded on an information recording medium is reproduced, and then the reproduced data is processed and recorded again onto the information recording medium. As an example of post-record editing, a usage is conceivable in which audio data or video data having been recorded is reproduced, undergoes a process of mixing the audio data with music such as background music or of superimposing a caption image onto the video data, and is recorded again onto the disk.

Hereinafter, as one example of conventional techniques, an example relating to conditions for recording and reproducing audio data and video data simultaneously in post-record editing will be described.

FIG. 2 is a diagram one-dimensionally showing a part of the arrangements of audio data recording areas and video data recording areas on a disk. In FIG. 2, 210, 212, 220, 222 and 240 denote audio data recording areas, and audio data sets A1, A2, Aj, Aj+1 and Ae are recorded respectively in these recording areas. Furthermore, 211, 213, 221, 223 and 241 denote video data recording areas, and video data sets V1, V2, Vj, Vj+1 and Ve are recorded respectively in these recording areas. The audio data recording areas and the video data recording areas are arranged alternately on the disk. For example, video that corresponds to audio of the audio data A1 is recorded as the video data V1, and in a similar manner, A2 and V2, Aj and Vj, Aj+1 and Vj+1, and Ae and Ve respectively correspond to each other. Furthermore, the same disk further is provided with areas into which audio data or video data can be recorded, separated from the above-described data. Of these, such audio data recording areas are shown in FIG. 2, and 250, 252, 260, 262 and 270 denote audio data recording areas serving as a separate area. Audio data sets that are recorded into these areas respectively are referred to as B1, B2, Bj, Bj+1 and Be. The video data recording area 241 and the audio data recording area 250 are on the same disk, but they are arranged apart from each other. It should be noted that there are a large number of pairs of an audio data recording area and a video data recording area before A1, between V2 and Aj, and between Vj+1 and Ae, although they are not shown. Similarly, there are a plurality of audio data recording areas between B2 and Bj, and between Bj+1 and Be in the separate area. Furthermore, there may be data of another kind between an audio data recording area and a video data recording area, or between a video data recording area and an audio data recording area, although it is not shown. The data of another kind will be described later with reference to FIG. 5.

A conventional example will be described in which post-record editing is performed on the thus arranged data in FIG. 2. In FIG. 2, a post-record starting point for audio is shown midway in the audio data A1, and a post-record starting point for video is shown midway in the video data V1, which corresponds to A1. In post-record editing, while video and audio are reproduced for confirmation, a post-record starting point is determined and post-record editing is started. Thus, post-record editing of the audio data A1 including the post-record editing points shown in FIG. 2 is started in a state where reproduction has been started from data slightly before A1. When post-record editing is started, not only are audio data and video data reproduced, but also video or audio is recorded simultaneously.

FIG. 3 is a diagram showing one example of conventional methods for performing post-record editing. The recording areas shown in FIG. 3 are the same as those described in FIG. 2. In the example of conventional post-record editing shown in FIG. 3, an example will be described in which once reproduced and processed audio data is recorded, without using a separate area on the disk, into an audio data recording area in which the data has been recorded. In this specification, post-record editing that reproduces data in a data recording area in which the data already has been recorded, processes the reproduced data, and then records the data again into the same recording area is referred to as "post-record editing in the same area."

In FIG. 3, it is assumed that reproduction already has been started from data slightly before the audio data A1, and data up to the starting edge of A1 has been reproduced on the disk. A time necessary for reproducing A1 from the starting edge to the ending edge is referred to as TA. After A1 is reproduced, the starting edge of the video data V1 is accessed. In FIG. 3, an access time from the ending edge of A1 to the starting edge of V1 is referred to as Tfav, but when A1 and V1 are arranged continuously with no data interposed therebetween, Tfav can be regarded as 0 and ignored. Then, V1 starts to be reproduced. In FIG. 3, a time necessary for reproducing V1 from the starting edge to the ending edge is referred to as TcV1.

In the processes up to this point, A1 and V1 that have been read out from the disk are decoded in a predetermined manner, and output as actual audio and video. Furthermore, for post-record editing, it is necessary to process these audio and video to be encoded into a data format in which the data can be recorded again onto the disk. Therefore, some process time is necessary until data that is to be written back onto the disk in post-record editing is prepared. In FIG. 3, an example is shown in which, since post-record data that is to be written back onto the audio data A1 has not been prepared yet, because of this process time, at the time point when data up to the ending edge of the video data V1 has been read out from the disk, the starting edge of the next audio data A2 is accessed directly. In FIG. 3, an access time from the ending edge of V1 to the starting edge of A2 is referred to as Tfva, but when V1 and A2 are arranged continuously with no data interposed therebetween, Tfva can be regarded as 0 and ignored.

Subsequently, it is assumed that data up to the ending edge of the video data V2 has been read out in a similar manner, and the above-described post-record data that is to be written back onto A1 has been prepared by this time point. Then, in order to record the post-record data, access is performed from the ending edge of V2 to the starting edge of A1 on the disk. In FIG. 3, this access time is referred to as Tf(1). At that time, the disk device is switched from a reproducing operation to a recording operation. Generally, when disk devicees are switched between a reproducing operation and a recording operation, a predetermined switching process time is often necessary. Therefore, the access time Tf(1) refers to the longer one of the time for moving from the ending edge of V2 to the starting edge of A1 and the process time for switching from reproducing to recording. In a state where the starting edge of the audio data A1 has been reached and the switching process from reproducing to recording has been completed, the post-record data is recorded onto the audio data A1. In FIG. 3, a time necessary for this recording is referred to as TA. After data up to the ending edge of A1 is recorded, access is performed from the ending edge of the audio data A1 to the starting edge of the audio data A3 in order to reproduce the next data. In FIG. 3, this access time is referred to as Tf(1). At that time, a predetermined switching process time is necessary because the disk device is switched from a recording operation to a reproducing operation. Therefore, the access time Tf(1) refers to the longer one of the time for moving from the ending edge of A1 to the starting edge of A3 and the process time for switching from recording to reproducing.

Subsequently, the audio data A3 and the video data V3 are read out in a similar manner, and the post-record data that is to be written back onto their preceding A2 has been prepared by this time point, and thus the audio data A2 is accessed and recording is performed thereonto. Then, the starting edge of their next reproduction data is accessed, and these processes are repeated. In the conventional example, post-record editing is performed by repeating these processes.

The portion from the audio data recording area 220 to the video data recording area 223 in FIG. 3 shows one cycle of the repetitive processes in this conventional post-record editing. In one cycle of the conventional post-record editing, the audio data Aj+1 and the video data Vj+1 are reproduced, then their preceding audio data Aj is accessed, and post-record data is recorded thereonto, and again the operation goes back to their next reproduction data. In FIG. 3, the time for reproducing audio data is referred to as TA, the time for reproducing the video data Vj+1 as TcVj+1, and the access time as Tf(j). In order to carry out post-record editing, it is necessary to satisfy conditions for performing successive reproduction in this one cycle.

FIG. 9 is a diagram showing one example of conventional methods for performing post-record editing in a separate area. The recording areas shown in FIG. 9 are the same as those described in FIG. 2. In the example of conventional post-record editing shown in FIG. 9, post-record editing is performed using a separate area on the disk. In this specification, post-record editing that reproduces data in a data recording area into which the data already has been recorded, processes the reproduced data, and then records the data into a separate area that is apart from the reproduced data on the disk is referred to as "post-record editing in a separate area."

There is a difference between the post-record editing in the separate area shown in FIG. 9 and the post-record editing in the same area shown in FIG. 3 with regard to the time for accessing an area into which post-record data is to be recorded. In the post-record editing in the same area shown in FIG. 3, an access time from the ending edge of the video data Vj+1 to the starting edge of the audio data Aj is referred to as Tf(j), and this is a short-distance access because the reproduced data and the recorded data are in the same area. On the other hand, in FIG. 9, an access time from the ending edge of the video data Vj+1 to the starting edge of the audio data recording area 260 is referred to as Tf, and this is a long-distance access because this separate area that is used in the post-recording is provided apart on the disk. In FIG. 9, a time necessary for recording post-record data Bj into the audio data recording area 260 serving as the separate area is referred to as TB, and TB can be regarded to have the same length of time as TA in the post-record editing in the same area shown in FIG. 3.

As described above, the only difference between the post-record editing in the same area and the post-record editing in the separate area is their times for accessing an area into which post-record recording is performed. Herein, both of the access times are referred to uniformly as Tf(j). In order to realize post-record editing, it is necessary to satisfy conditions for performing successive reproduction in one cycle of the repetitive processes in post-record editing.

In one cycle of post-record editing, when, with respect to the j-th video data Vj, the size of the video data is taken as YVj, the bit rate of the video data as VdVj, the time for reproducing the video data as TcVj, the time for recording or reproducing audio data as TA, the access time from the audio data to the video data as Tfav, the time for reading out one ECC block as Ts, the number of ECC blocks that are skipped in the video data as "a", and the number of ECC blocks that are skipped in the audio data as "b", in order to realize one cycle of post-record editing, it is necessary to satisfy (time for consuming the j-th video data)≧(time for processing one cycle), that is, $$YVj/VdVj \geq TA+Tfav+TcV(j+1)+2\times Tf(j)+TA+(a+2\times b)\times Ts.$$

Aside from the above, as a technique relating to post-record editing on an optical disk, a technique has been disclosed in, for example, JP H11-259992A (FIG. 3) in which original AV data is recorded while reserving an area for post-record editing in advance. It should be noted that there is no reference to a condition for realizing post-record editing in JP H11-259992A.

However, in the conventional method as shown in FIG. 3, it is necessary to perform access every time when one set of post-record data is recorded in one cycle of the repetitive processes in post-record editing, and thus there is the problem that conditions for realizing post-record editing become strict. When using this conventional method and determining as to the conditions for realizing post-record editing, it is often determined that post-record editing cannot be performed on a disk on which video and audio are recorded.

DISCLOSURE OF INVENTION

In view of these problems of the conventional method, an object of the present invention is to provide a recording/reproduction device that can perform post-record editing on a disk on which post-record editing has been determined to be impossible by conventional methods, and that can reproduce data on which post-record editing has been thus performed, by devising a method for access in one cycle of a repetitive processes of post-record editing.

In order to solve the above problems, a first recording/reproduction device according to the present invention is a recording/reproduction device for an information recording medium on which video data and audio data are recorded independently of each other. The recording/reproduction device is characterized in that on the information recording medium, in a separate area from a main sequence in which data blocks including original audio data and video data are recorded in succession, an additional sequence in which data blocks including post-record audio data are recorded in succession is formed, and that the recording/reproduction device is provided with a pick-up for recording or reproducing information onto/from the information recording medium, and a control portion for controlling an operation of the pick-up, in which during reproduction from the information recording medium, the control portion controls an operation of the pick-up in such a manner that the pick-up accesses the main sequence and the additional sequence alternately and reproduces successive M (M is an integer of 2 or larger) data blocks in every access to each of the main sequence and the additional sequence.

Furthermore, a second recording/reproduction device according to the present invention is a recording/reproduction device that records video data and audio data independently of each other onto an information recording medium. The recording/reproduction device is characterized in that on the information recording medium, in a separate area from a first area in which data blocks including original audio data and video data are to be recorded, a second area in which data blocks including post-record audio data are to be recorded is provided, and that the recording/reproduction device is provided with a pick-up for recording or reproducing information onto/from the information recording medium, and a control portion for controlling an operation of the pick-up, in which when post-record audio data is recorded onto the information recording medium on which original audio data and video data are recorded, the control portion controls an operation of the pick-up in such a manner that successive M (M is an integer of 2 or larger) data blocks are reproduced from the first area, and then M data blocks including post-record audio data corresponding to the M data blocks are recorded into the second area in succession.

In the present invention, the value of M can be fixed from the start to the end of recording or reproduction, but it is also possible to perform a recording or reproducing operation while the control portion dynamically changes the value of M in accordance with various conditions such as the data amount in a recording buffer or a reproduction buffer during the recording or reproducing operation.

As described above, when data that has been subjected to post-record editing is recorded onto an information recording medium, a plurality of data blocks including post-record audio data are recorded onto the information recording medium in succession, and when reproduction from the information recording medium that has been subjected to post-record editing is performed, a plurality of continuous data blocks are reproduced in succession in every access to each of the main sequence and the additional sequence. Thus, the number of times of access operations of the pick-up can be reduced. Therefore, the conditions for post-record editing become easier to realize, so that post-record editing can be performed also on an information recording medium on which post-record editing conventionally has been determined to be impossible, and reproduction from the information recording medium also can be performed.

BRIEF DESCRIPTION OF THE DRAWINGS

FIG. 5 includes diagrams showing recording areas for audio data and data of another kind in detail.

DESCRIPTION OF THE INVENTION

Figure 1:
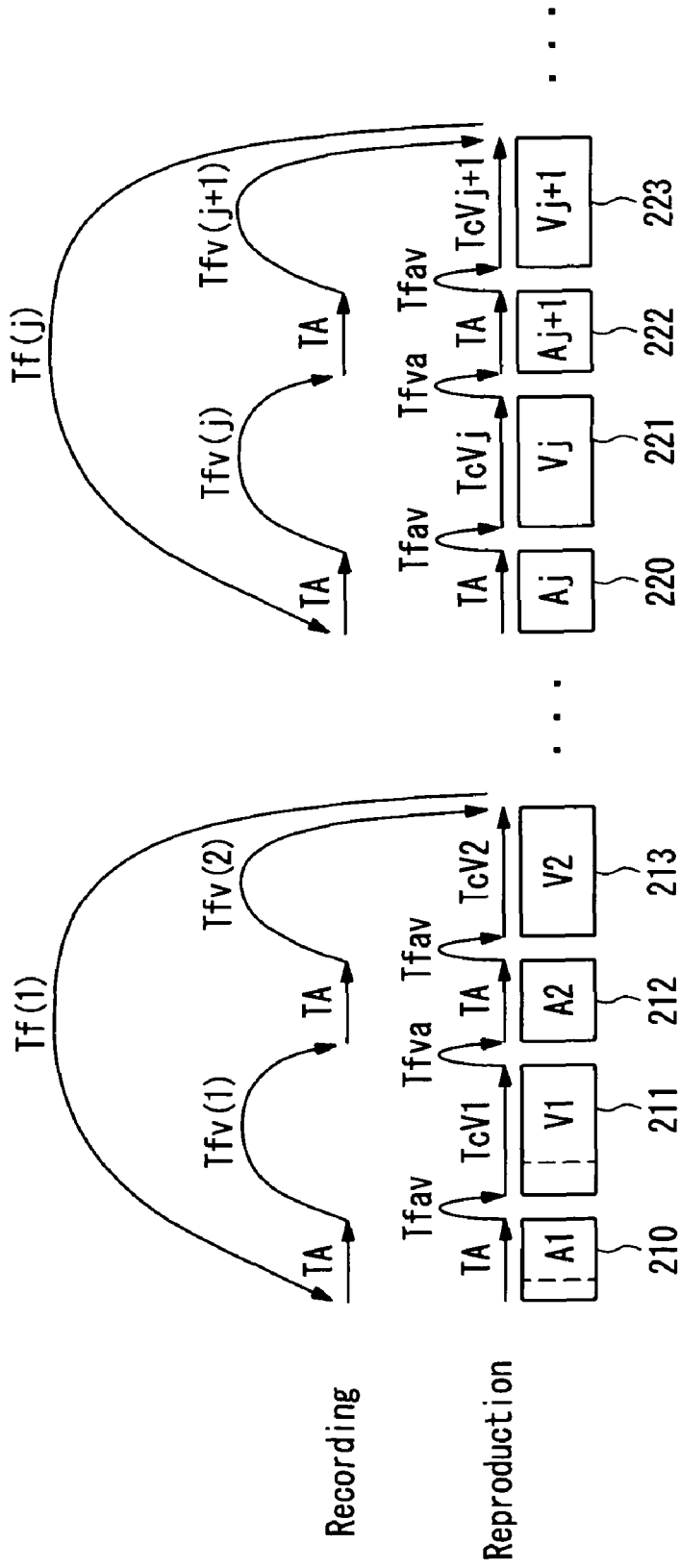
FIG. 1 is a diagram showing a method for performing post-record editing in the same area according to one embodiment of the present invention.

In the first recording/reproduction device, it is preferable that the control portion controls an operation of the pick-up in such a manner that between audio data and video data corresponding to each other in the same real-time, the audio data is reproduced before the video data.

Furthermore, in the first recording/reproduction device, it is preferable that the control portion controls an operation of the optical pick-up in such a manner that when M data blocks corresponding to each other in a same real-time are read out from each of the main sequence and the additional sequence, (1) original audio data is reproduced from a head block of the M data blocks in the main sequence, (2) post-record audio data is reproduced in succession from the M data blocks in the additional sequence, corresponding to the M data blocks in the main sequence, (3) video data is reproduced from the head block of the main sequence, and (4) original audio data and video data are reproduced from (M−1) data blocks in the main sequence.

Furthermore, in the first recording/reproduction device, it is preferable that when a total amount of video data that is read out from (M+1) data blocks is taken as YV, a bit rate of the video data is taken as VdV, a time necessary for reading out the video data from the (M+1) data blocks is taken as Tsv, and a process time that is necessary for processes other than reading out of the video data during a period between a time when reading out of the video data from the first data block is started and a time when reading out of the video data from the (M+1)-th data block is ended in the (M+1) data blocks is taken as Tnv, $YV/VdV \geq Tsv + Tnv$ is satisfied.

In the second recording/reproduction device, it is preferable that when original audio data and video data are recorded in the first area, the control portion controls the pick-up in such a manner that the video data and the audio data are recorded alternately with a space within a range of fine seek of the pick-up.

Furthermore, in the second recording/reproduction device, it is preferable that a video reproduction buffer for accumulating video data that is read out from the information recording medium, an audio reproduction buffer for accumulating audio data that is read out from the information recording medium, a recording buffer for temporarily storing the post-record audio data before it is recorded, a video decoder for decoding video data, an audio decoder for decoding audio data, and an encoder for encoding audio data further are provided, and that the value of M is within a range in which during the M data blocks are reproduced from the first area in succession, neither of the video reproduction buffer, the audio reproduction buffer, and the recording buffer overflows or underflows, and transfer of video data to the video decoder does not stop.

Furthermore, in the above-described preferable second recording/reproduction device, it is preferable that when Tf(j): an access time from an ending edge of a video data recording area to a starting edge of an audio data recording area for post-record editing, after the video data is reproduced, Vt: a data rate when data is read out from the information recording medium, TI: a time necessary for reproducing data that is recorded in a video data recording area, VdV: a bit rate of video data, N: a number of audio channels, VdA: a bit rate of audio data, and Tfv: an access time from an ending edge of an audio data recording area to a starting edge of a next audio data recording area, the value of M satisfies $M \geq (Tf(j) \times Vt)/(TI \times (Vt - VdV \times 2 \times N \times VdA) - Tfv \times Vt)$. Furthermore, when the audio data has a plurality of channels, it is preferable that the recording/reproduction device comprises a plurality of audio decoders in accordance with the plurality of channels.

Hereinafter, embodiments of the present invention will be described in further detail with reference to the drawings.

Embodiment 1

Figure 6:
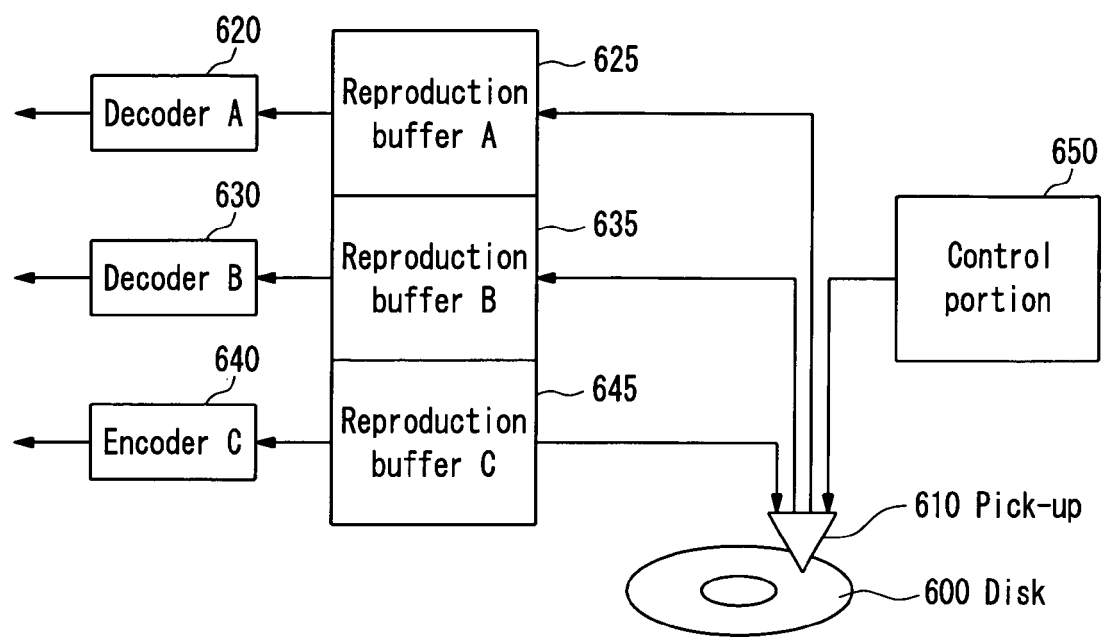
FIG. 6 is a diagram showing an editing model according to one embodiment of the present invention.

First, one example of methods for performing post-record editing according to one embodiment of the present invention and conditions for realizing post-record editing in this method will be described. Referring to FIG. 6, an editing model will be described in which a plurality of sets of real-time data are recorded and reproduced simultaneously. FIG. 6 shows the editing model of a recording/reproduction device according to one embodiment of the present invention. In FIG. 6, 600 denotes a disk serving as an information recording medium, 610 denotes a pick-up for recording/reproducing real-time data onto/from the information recording medium, 625 denotes a reproduction buffer A for accumulating real-time data A that has been read out from the information recording medium, 620 denotes a decoder A for decoding the real-time data A that has been accumulated in the reproduction buffer A, 635 denotes a reproduction buffer B for accumulating real-time data B that has been read out from the information recording medium, 630 denotes a decoder B for decoding the real-time data B that has been accumulated in the reproduction buffer B, 640 denotes an encoder C for encoding real-time data C, 645 denotes a recording buffer C for recording the encoded real-time data C onto the information recording medium, and 650 denotes a control portion 650 for controlling an operation of the pick-up. In FIG. 6, two pairs of a decoder and a reproduction buffer and one pair of an encoder and a recording buffer are shown, but the number of pairs of buffers, encoders, and decoders may be increased or deceased depending on the kind and the number of real-time data that is recorded and reproduced simultaneously.

In simultaneous recording and reproducing such as post-record editing, a decoder continues to consume data in a reproduction buffer all the time, whereas an encoder continues to send data to a recording buffer all the time. When data is read out from the disk, the data is accumulated in the reproduction buffer, and thus reproduction of real-time data does not stop unless the reproduction buffer becomes empty during the access time. On the other hand, data in the recording buffer decreases when the data is recorded onto the disk, but the data continues to be accumulated all other times, and thus recording of real-time data does not stop unless the recording buffer overflows during, for example, the access time. In order to record and reproduce real-time data simultaneously, it is necessary to satisfy these conditions at the same time.

Figure 7:
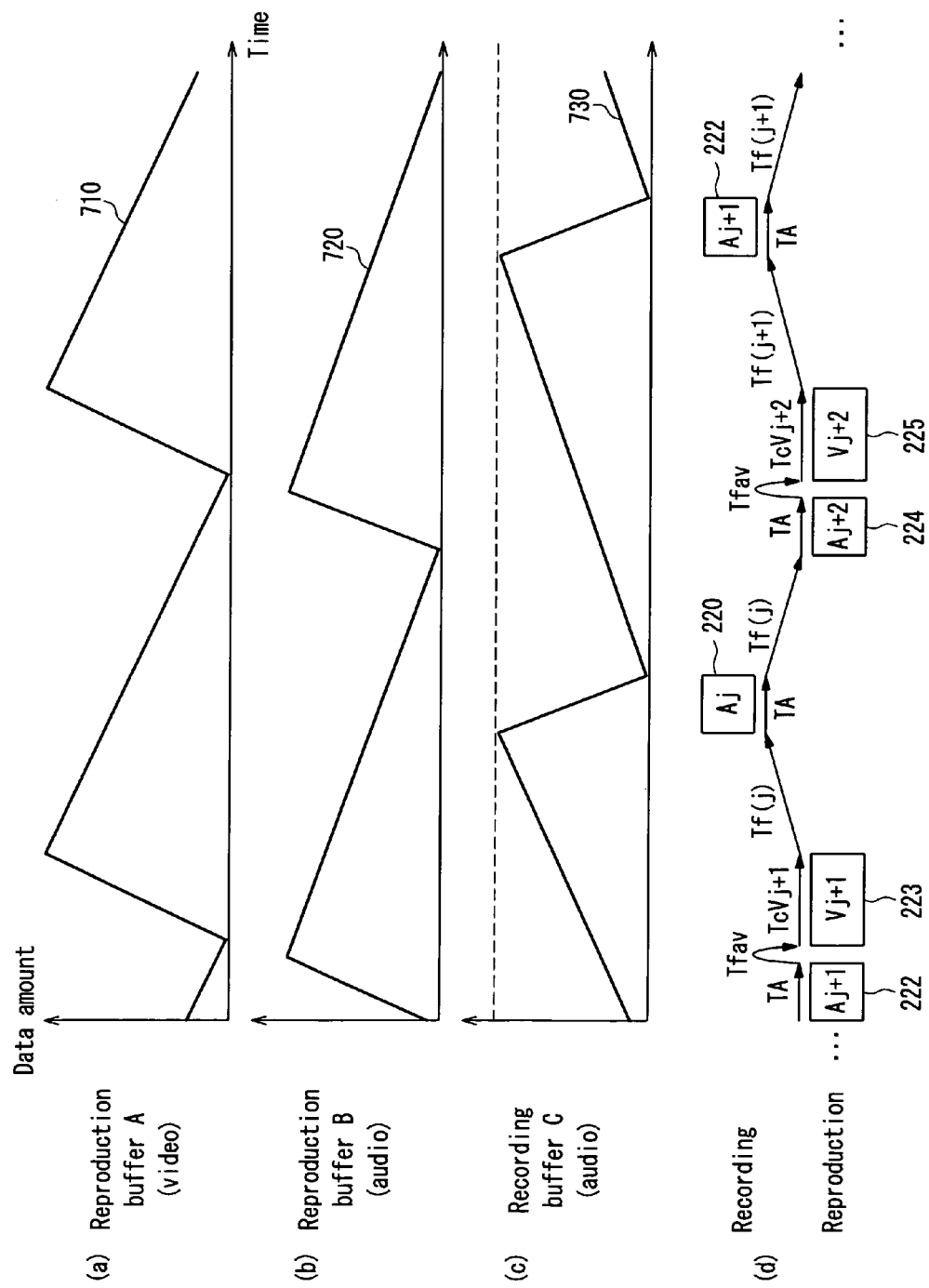
FIG. 7 is a diagram showing changes over time of the amount of data in a recording buffer and reproduction buffers.

FIG. 7 shows changes over time of the amount of data in a recording buffer and reproduction buffers, and these buffers correspond to the reproduction buffers and the recording buffer described in FIG. 6. In FIG. 7(a), 710 shows a change over time of the amount of data in the reproduction buffer A, more specifically, video data that is to be reproduced. In FIG. 7(b), 720 shows a change over time of the amount of data in the reproduction buffer B, more specifically, audio data that is to be reproduced. In FIG. 7(c), 730 shows a change over time of the amount of data in the recording buffer C, more specifically, audio data that is to be recorded in post-recording. FIG. 7(d) shows schematically the order of recording, reproduction and access in the conventional post-record editing.

In FIG. 7(d), first, the audio data Aj+1 in the audio data recording area 222 is reproduced. The time necessary for this reproduction is referred to as TA. Audio data is accumulated in the reproduction buffer B in FIG. 7(b) during a period of TA, but the data in the reproduction buffer B continues to decrease all other times. Then, after the access in Tfav, the video data Vj+1 in the video data recording area 223 is reproduced. A time necessary for this reproduction is referred to as TcV(j+1). Video data is accumulated in the reproduction buffer A in FIG. 7(a) during a period of TcV(j+1), but the data in the reproduction buffer A continues to decrease all other times. Then, after the access in Tf(j), the audio data recording area 220 is reached. Here, post-record audio data accumulated in FIG. 7(c) is recorded into the audio data recording area 220 as the audio data Aj. A time necessary for this recording is referred to as TA. Audio data in the recording buffer C in FIG. 7(c) decreases in a period of TA, but the data in the recording buffer C continues to increase at all other times. Then, the next reproduction data, that is, audio data Aj+2 in an audio data recording area 224 is accessed. Subsequently, similar processes are repeated to continue the post-record editing.

In order to realize the post-record editing, it is necessary to perform the repetitive processes in a state where no reproduction buffer becomes empty and no recording buffer overflows. Focusing on the changes over time of the amounts of data in the buffers shown in FIGS. 7(a), 7(b) and 7(c), the amounts of data in the reproduction buffers decrease, and the amount of data in the recording buffer increases during the access times during which no data is recorded or reproduced. In other words, both of the recording buffer and the reproduction buffers come closer to their limitation as the access times become longer, and thus it is important to shorten the access times in order to realize post-record editing.

Therefore, in the present invention, the conditions for realizing post-record editing are determined with the editing method shown in FIG. 1 and condition formulas based on the method. Hereinafter, the contents will be described with reference to FIG. 1.

FIG. 1 is a diagram showing a method for performing post-record editing in the same area according to the present invention. In FIG. 1, recording areas 210 to 213, and 220 to 223 are the same as those described in FIG. 2. It should be noted that the following procedure of post-record editing is realized by the control portion 650 controlling an operation of the pick-up 610.

In FIG. 1, after the audio data A1 is reproduced, the video data V1 is accessed, and the video data V1 is reproduced. Then, instead of recording post-record data, the next audio data A2 is accessed directly. Then, the audio data A2 is reproduced, and the video data V2 is accessed. The access time Tfav from audio data to video data and the access time Tfva from video data to audio data can be regarded as 0 and ignored when the data is recorded in succession. Then, after data up to the video data V2 is reproduced completely, access is performed from the ending edge of the video data V2 to the starting edge of the audio data A1 in the time Tf(1) in order to record the post-record data. Then, the post-record data is recorded onto the audio data A1 in the time TA, and instead of returning to the next reproduction data, access is performed from the ending edge of the audio data A1 to the starting edge of the audio data A2 in the time Tfv(1) in order to record the next post-record data. Then, the post-record data is recorded onto the audio data A2 in the time TA, and the next reproduction data is accessed in the time Tfv(2).

The above-described post-record editing is defined as one cycle, and then similar processes are repeated. This one cycle of the repetitive processes is applied to the recording areas 220 to 223 in FIG. 1, and times necessary for processing one cycle are listed as below following the order of the process; the reproduction time TA of the audio data Aj, the access time Tfav from the ending edge of the audio data Aj to the starting edge of the video data Vj, the reproduction time TcVj of the video data Vj, the access time Tfva from the ending edge of the video data Vj to the starting edge of the audio data Aj+1, the reproduction time TA of the audio data Aj+1, the access time Tfav from the ending edge of the audio data Aj+1 to the starting edge of the video data Vj+1, the reproduction time TcV(j+1) of the video data Vj+1, the access time Tf(j) from the ending edge of the video data Vj+1 to the starting edge of the audio data Aj, the post-record recording time TA of the audio data Aj, the access time Tfv(j) from the ending edge of the audio data Aj to the starting edge of the audio data Aj+1, the post-record recording time TA of the audio data Aj+1, and then the access time Tfv(j+1) from the ending edge of the audio data Aj+1 to the starting edge of the next reproduction data. It should be noted that the access time Tf(j) from the ending edge of the video data Vj+1 to the starting edge of the audio data Aj includes the process time for switching from reproducing to recording, and the access time Tfv(j+1) from the ending edge of the audio data Aj+1 to the starting edge of the next reproduction data includes the process time for switching from recording to reproducing.

The time for processing one cycle of post-record editing is calculated by adding the above-described process times and is expressed by the following formula. In the above description, one cycle includes processes in which two pairs of audio data and video data are reproduced in succession, and then two sets of audio data are recorded in post-recording in succession into the same areas as the reproduced data.

(Time for processing one cycle when post-record editing in the same area is performed on two pairs in succession)=$TA+Tfav+TcVj+Tfva+TA+Tfav+TcV(j+1)+Tf(j)+TA+Tfv(j)+TA+Tfv(j+1)$ Herein, when audio data and video data are recorded continuously and adjacent to each other, Tfav and Tfva are ignored as 0. Furthermore, when it is assumed that the time Tfv(j) for skipping the video data Vj is substantially equal to the time Tfv(j+1) for skipping the video data Vj+1 in the access process and both are taken as Tfv, the following formula is obtained.

(Time for processing one cycle when post-record editing in the same area is performed on two pairs in succession)

$=Tf(j)+2\times Tfv+TcVj+TcV(j+1)+2\times 2\times TA$

Herein, as described with reference to FIG. 7, in order to realize post-record editing, it is necessary that neither of the reproduction buffer for audio data and the reproduction buffer for video data becomes empty, and the recording buffer for post-record audio data does not overflow. These conditions will be found below.

First, the condition regarding the reproduction buffer for video data will be found. In the case where post-record editing in the same area is performed on two pairs in succession as described in FIG. 1, when the data amount of the video data Vj is taken as YVj and the data amount of the video data Vj+1 is taken as YV(j+1), the size of video data that is reproduced from the disk is the total size of these, that is, YVj+YV(j+1) and this sized data is accumulated in the reproduction buffer for video data. This accumulated data is consumed by the decoder at the bit rate of video data. In consideration of a variable bit rate, the bit rate of the video data Vj is taken as VdVj, and the bit rate of the video data Vj+1 is taken as VdV(+1), and thus a time until data in the reproduction buffer for video data has been consumed by the decoder and the buffer becomes empty is $YVj/VdVj+YV(j+1)/VdV(j+1)$.

If this time is not shorter than the above-calculated time for processing one cycle of post-record editing, it is possible to perform post-record editing for one cycle while the reproduction buffer for video data does not become empty. This is the condition for performing post-record editing for one cycle, regarding the reproduction buffer for video data.

Next, the condition regarding the reproduction buffer for audio data will be found. In the case where post-record editing in the same area is performed on two pairs in succession as described in FIG. 1, the size of audio data that is reproduced from the disk is 2×YA, where the audio data has a fixed bit rate VdA, each audio data is recorded for the same length of time, and the data amount is YA. Since the audio data is consumed by the decoder at the bit rate VdA, a time until the reproduction buffer for audio data becomes empty is $2\times YA/VdA$.

If this time is not shorter than the above-calculated time for processing one cycle of post-record editing, it is possible to perform post-record editing for one cycle while the reproduction buffer for audio data does not become empty. This is the condition for performing post-record editing for one cycle, regarding the reproduction buffer for audio data.

Next, the condition regarding the recording buffer for audio data will be found. For methods for recording post-record data, two recording methods, that is, synchronous recording and non-synchronous recording, are conceivable. The first synchronous recording is a recording method by which, in one cycle of post-record editing, the amount of original data for post-record editing that is read out from a disk is the same as the amount of post-record data that is written back onto the disk. When post-record data is recorded in this synchronous recording, since the amount of reproduced audio data is the same as that of recorded audio data in every cycle, there is substantially no difference in the amount of data, and it is possible to prevent the recording buffer for audio from overflowing or underflowing. Therefore, when post-record data is recorded in synchronous recording, it is sufficient that the recording buffer for audio data has the capacity at least in which post-record data for one cycle can be accumulated, and it is not necessary to worry that the recording buffer may underflow or overflow.

The second non-synchronous recording is a recording method by which, in one cycle of post-record editing, the amount of original data for post-record editing that is read out from a disk is different from the amount of post-record data that is written back onto the disk. For example, when data with a high bit rate is edited or when data that is subjected to be ejected are located apart from each other on a disk, a time for recording post-record data in one cycle may be insufficient. In such a case, in non-synchronous recording of post-record data, the remaining post-record data that could not be written in one cycle is accumulated in the recording buffer and recorded later. In the case of non-synchronous recording, the remaining post-record data that could not be recorded onto the disk is accumulated in the recording buffer for audio in every cycle. Thus, it is necessary that the recording buffer does not overflow until all post-record editing is ended. This condition is expressed by the following formula.

(Size of the recording buffer)≧(total number of cycles of post-record editing)×(amount of data increased in the recording buffer per cycle)

The total number of cycles of post-record editing refers to the number of cycles that are necessary from the starting point to the ending point of the post-record editing. The necessary size of the recording buffer can be calculated by multiplying the total number of cycles by the amount of data increased in the recording buffer per cycle. As described above, the two methods are conceivable for recording post-record data, and either one of them can be used.

In view of the conditions for the three buffers that have been described above, that is, the conditions for the reproduction buffer for video data, the reproduction buffer for audio data, and the recording buffer for audio data, as data has a higher bit rate, the data in a buffer is consumed faster, and thus the conditions for realizing post-record editing become more strict. Here, the condition regarding video data is focused as data whose bit rate is the highest.

In the above description, the time until data in the reproduction buffer for video data has been consumed by the decoder and the buffer becomes empty has been calculated. It is assumed that each video data is recorded on a disk so as to have the same reproduction time when decoded and reproduced. More specifically, in FIG. 1, in consideration of a variable bit rate, the video data sets $Vj$ and $Vj+1$ can have different data amounts on a disk, but both of them become video for the same seconds when decoded by the decoder and output as video. This time is referred to as a data record length TI. The unit of TI is time. Video data and audio data are recorded in such a manner that their video and audio correspond each other, and thus recording is performed in such a manner that TI of audio data is equal to TI of video data.

However, audio data has a lower bit rate than video data, and thus the audio data has a smaller data amount than the video data on a disk even when they have the same record length TI.

When post-record editing in the same area is performed on two pairs in succession, the time until data in the reproduction buffer for video data has been consumed by the decoder and the buffer becomes empty is expressed as 2×TI, using the data record length TI. If the time for processing one cycle of post-record editing is shorter than this time, the post-record editing is realized. Thus, the condition for realizing post-record editing focusing on video data is 2×TI≧(time for processing one cycle when post-record editing in the same area is performed on two pairs in succession).

When the above-described formula is inserted into this, the following inequality is obtained.

$$2 \times TI \geq Tf(j) + 2 \times Tfv + TcVj + TcV(j+1) + 2 \times 2 \times TA$$

Hereinafter, TA, which is shown as a time for recording or reproducing audio data, will be described in detail.

Figures 4A, 4B:
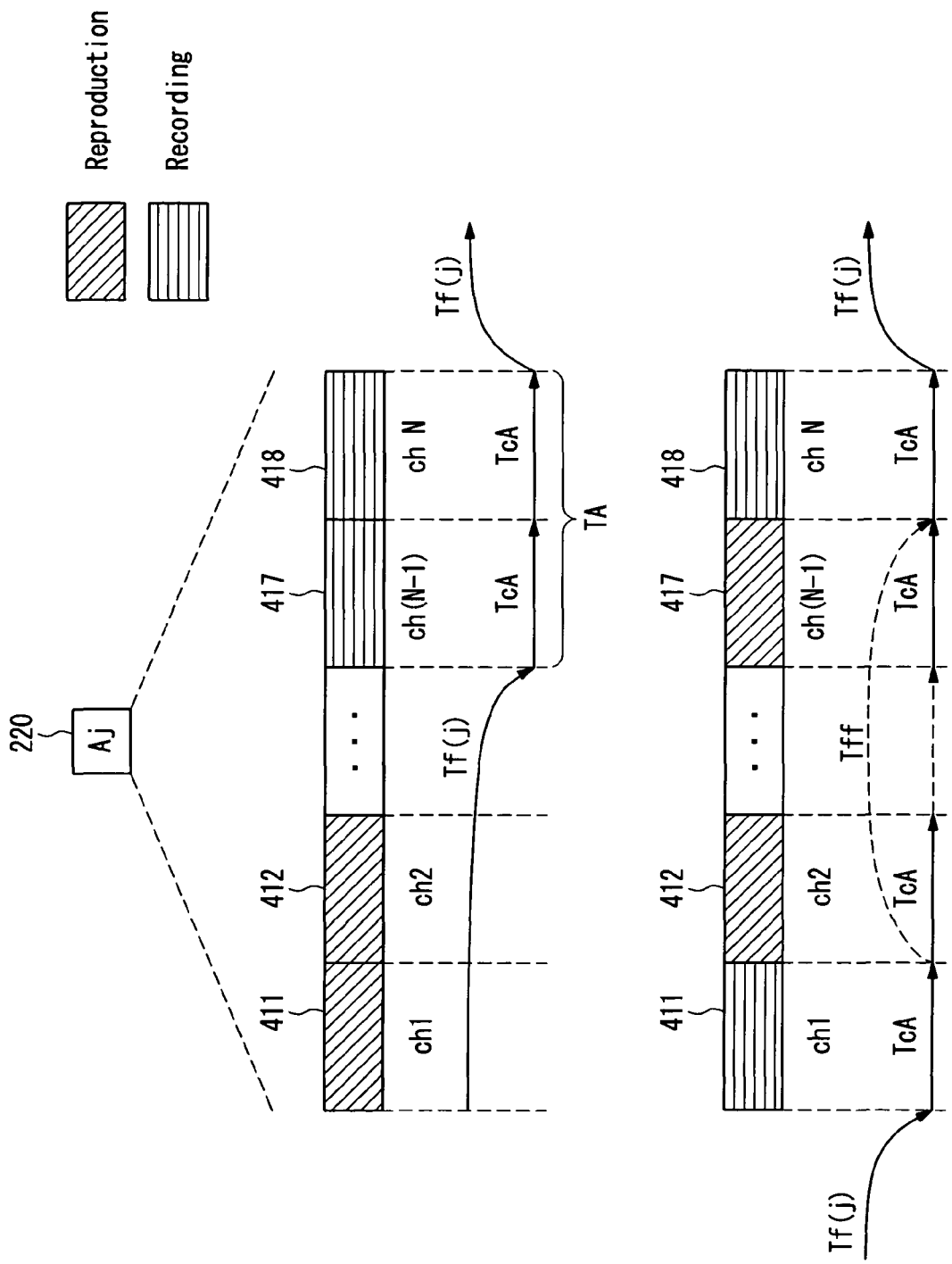
FIG. 4 includes diagrams showing an audio data recording area in detail.

FIG. 4 includes diagrams showing an audio data recording area in detail. In FIG. 4, 220 is the same as the audio data recording area 220 shown in FIGS. 1 and 2. FIGS. 4A and 4B show this recording area while magnifying its inside. The inside of the audio data recording area is divided corresponding to channels so that data having a plurality of audio channels can be recorded thereonto. In both FIGS. 4A and 4B, recording areas for N channels are shown, and 411 denotes a recording area for ch1, 412 denotes a recording area for ch2, 417 denotes a recording area for ch(N−1), and 418 denotes a recording area for chN. N is an integer of 1 or larger, and there may be a plurality of recording areas for audio channels between the recording areas 412 and 417.

Figure 3:
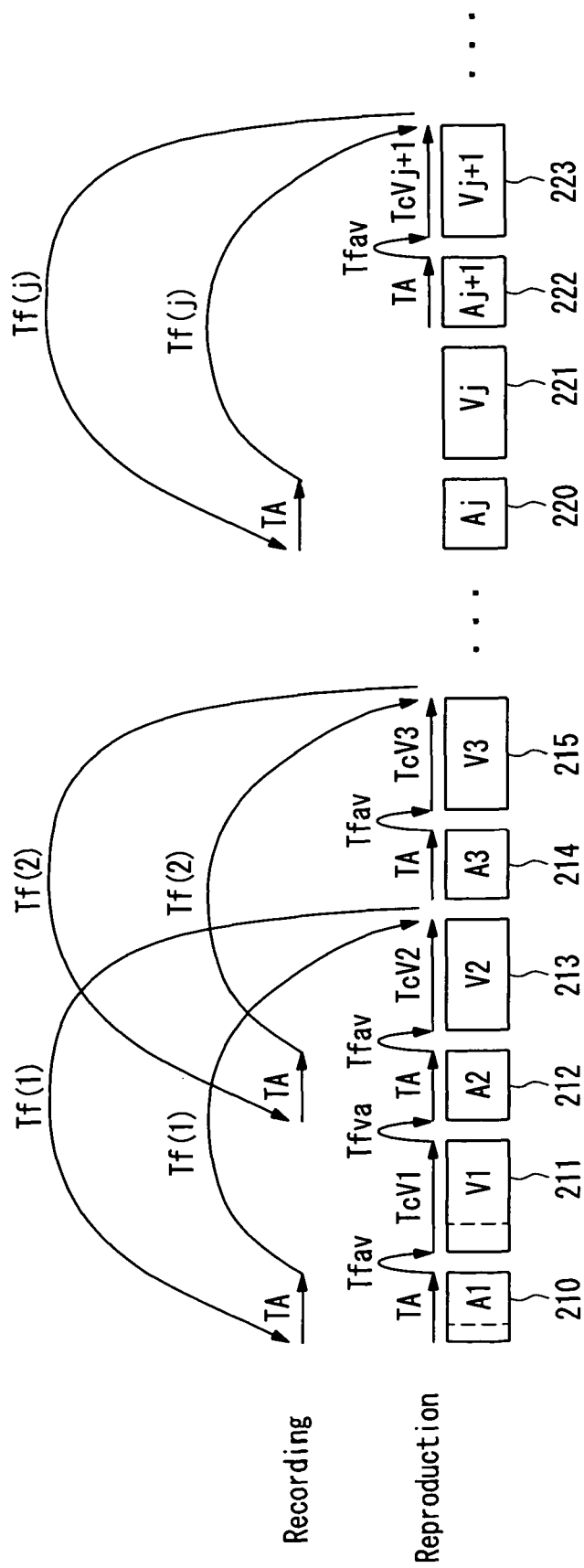
FIG. 3 is a diagram showing one example of conventional methods for performing post-record editing.

Hereinafter, the manner in which access is performed in post-record editing will be described with reference to FIG. 4 described above. In FIG. 4A, it is assumed that ch1 and ch2 are for audio data having been recorded onto the disk in advance, and the audio data in ch1 and ch2 are reproduced to be original audio for post-record editing. At that time, ch(N−1) and chN are assumed to be empty areas, and while the audio data in ch1 and ch2 are held, post-record audio data can be recorded onto ch(N−1) and chN. With reference to FIG. 3, an example has been described in which the video data $Vj+1$ is reproduced, and then the starting edge of the audio data $Aj$ is accessed in the access time $Tf(j)$ in order to record the post-record data. However, in FIG. 4A, the head of an empty area for a channel onto which post-record recording is performed is accessed. Therefore, in FIG. 4A, the landing point of the access is, to be exact, not the starting edge of the audio data recording area 220, but the starting edge of ch(N−1) for audio data. Then, after the post-record data is recorded onto ch(N−1) and chN, the starting edge of the next reproduction data is accessed in the access time $Tf(j)$. When a time necessary for recording audio data for one channel is taken as TcA, and a time for recording or reproducing a desired channel in the audio data recording area 220 is taken as TA, since data for ch(N−1) and ch2, that is, for two channels in total is recorded in FIG. 4A, TA=2×TcA is satisfied. In this manner, with reference to FIG. 4A, the case has been described in which empty areas for a plurality of channels onto which post-record recording is performed are continuous inside of the audio data recording area 220.

On the other hand, in the example shown in FIG. 4B, it is assumed that ch2 and ch(N−1) are for audio data having been recorded onto the disk in advance, and the audio data in ch2 and ch(N−1) are reproduced to be original audio for post-record editing. At that time, ch1 and chN are assumed to be empty areas, and while the audio data in ch2 and ch(N−1) are held, post-record audio data is recorded onto ch1 and chN. In this case, the landing point of the access for performing post-record recording is the starting edge of ch1 for audio data. After the post-record data is recorded onto ch1, it is necessary to access the starting edge of chN.

Herein, a method for access in an optical disk device will be described. A pick-up in an optical disk device is also referred to as an optical head. A pick-up itself can be moved in the radial direction of the disk and a lens potion mounted on the pick-up also can be moved in the radial direction of the disk in an independent operation from the pick-up. Fine seek is also referred to as "track jump" or "kick," and is a method by which while the pick-up position of the optical disk device is fixed, only the lens portion is moved in the radial direction of the disk so as to move to a target track position. The fine seek is used in a short-distance access on a disk because the movable range of a lens is narrow. In the fine seek, a target track position is reached in a short time because only the lens portion is moved. On the other hand, for a long-distance access, a seek operation is used in which the entire pick-up is moved. This seek operation is also referred to as "long jump" or "long seek." The movable range is wide, but the pick-up itself is moved, and thus access takes a longer time than the fine seek. Furthermore, in the case where the disk medium is configured by spiral tracks, and target data is before the present reading-out position, it is also possible to reach the target data position by tracing the spiral tracks without any processing. In this specification, the method for access by such a trace operation is referred to as "rotational access."

In FIG. 4B, two methods for access are shown from the ending edge of ch1 to the starting edge of chN. The first one is a method by which access is performed from the ending edge of ch1 to the starting edge of chN in the access time Tff by an access operation such as the fine seek. The second one is a method by which the starting edge of chN is reached without any processing by rotational access. Generally, audio data often has a lower bit rate and a smaller data amount per channel than video data. Therefore, in the case of audio data for several channels, reaching the starting edge of chN by rotational access may take a shorter time than accessing there by the fine seek operation. In such a case, in the example in FIG. 4B, it is possible that after post-record data is recorded onto ch1, the starting edge of chN is reached by rotational access, and then post-record data is recorded onto chN. As a result, all audio channels, that is, areas for N channels are traced, and thus the process time in FIG. 4B is expressed as TA=N×TcA. In this manner, with reference to FIG. 4B, the case has been described in which empty areas for a plurality of channels onto which post-record recording is performed are not continuous inside of the audio data recording area 220.

When FIGS. 4A and 4B are compared as described above, although audio data for two channels is recorded in post-recording in both the cases, their process times are different from each other. Therefore, it is desirable that a time necessary for processing post-record editing is calculated considering which audio channels are empty areas inside of an audio data recording area, but for the sake of simplicity, the process time can be taken as TA=N×TcA in the worst case as shown in FIG. 4B.

Figure 2:
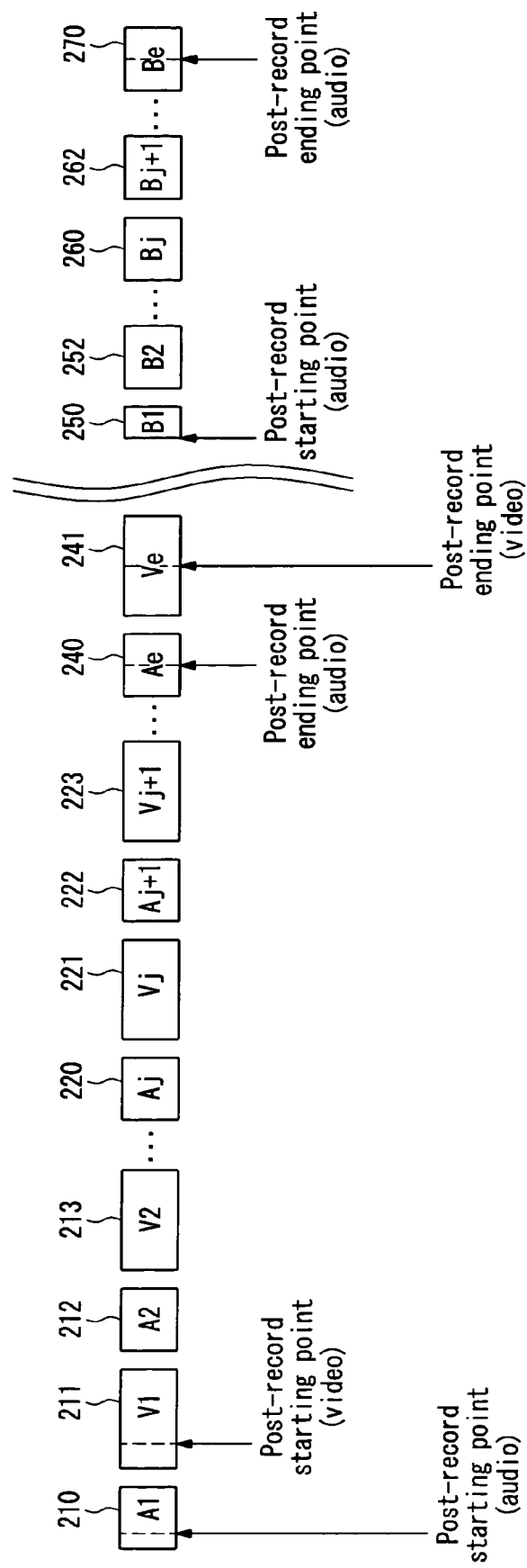
FIG. 2 is a diagram one-dimensionally showing a part of arrangements of audio data recording areas and video data recording areas on a disk.

FIG. 5 includes diagrams showing recording areas for audio data and data of another kind in detail. In the description of FIG. 2, it has been described that there may be data of another kind between an audio data recording area and a video data recording area. Examples of such data of another kind include data in which the same contents as adjacent audio data or video data are recorded with a lower bit rate and control data relating to adjacent audio data or video data. In FIG. 5, data recording areas of another kind are denoted by 530 and 540, and data of another kind recorded in the areas is denoted by Lj. The other symbols are the same as those in FIG. 4.

Since the data of another kind relates to its adjacent audio data or video data, when the audio data or the video data is changed in, for example, post-record editing, it is necessary to change the data of another kind relating to the data. For example, when the data of another kind is data with a low bit rate, and the audio data is changed in post-record editing, it is necessary to change the audio data with a low bit rate in the post-record editing.

In FIG. 5A, an example is shown in which the recording area 530 for data of another kind is provided adjacently after the audio data recording area 220. In the case where ch(N−1) and chN for audio data are used for recording in post-recording, after audio data for two channels is recorded, it is necessary to update the data Lj of another kind in post-recording. Since the data of another kind has a low bit rate, the data is regarded as corresponding to, for example, audio data for about one channel. As a result, in the post-record editing, data in an amount obtained by adding the audio data for two channels and the data of another kind, that is, audio data for three channels is recorded. Therefore, the process time TA can be expressed as TA=3×TcA.

In FIG. 5B, the recording area 540 for data of another kind is provided adjacently before the audio data recording area 220. In the case where ch(N−1) and chN for audio data are used for recording in post-recording in a similar manner to FIG. 5A, before audio data for two channels is recorded, it is necessary to update the data Lj of another kind. Therefore, the landing point of the access for performing post-record recording is the starting edge of the data Lj of another kind. After the data Lj of another kind is recorded, the audio data in ch(N−1) is accessed. The access from the ending edge of the data Lj of another kind to the starting edge of the audio data in ch(N−1) can be reached in the access time Tff in a similar manner to the above, and also can be reached by rotational access. Then, the audio data in ch(N−1) and chN are recorded and the next reproduction data is accessed. As a result, in the example shown in FIG. 5B, all of the data Lj of another kind and the audio data for N channels are traced, and thus the process time TA can be expressed as TA=(N+1)×TcA.

When FIGS. 5A and 5B are compared as described above, although audio data for two audio channels ch(N−1) and chN is recorded in post-recording in both the cases, their process times are different from each other depending on the arrangement of the data of another kind. Therefore, in post-record editing, it is desirable that a time necessary for processing post-record editing is calculated also giving consideration as to the arrangement of data of another kind, but for the sake of simplicity, the process time can be taken as TA=N×TcA in the worst case as shown in FIG. 4B, regarding the data of another kind as one audio channel. In this case, it is possible to take the number of channels obtained by adding one channel for data of another kind to the number of audio channels as N.

Furthermore, a defect that cannot be recorded or reproduced may be in an audio data recording area or a recording area for data of another kind on the disk. It is necessary to skip such a defect at the unit of ECC block, and neither recording or reproducing can be performed on the disk while the defect is skipped. When a time for reading out one ECC block is taken as Ts, the number of ECC blocks that are skipped in the video data is taken as "a", and the number of ECC blocks that are skipped in the audio data including the data of another kind is taken as "b", the process time TA that is necessary for recording the audio data in post-recording can be expressed as $$TA = N \times TcA + b \times Ts.$$

Furthermore, a time necessary for reproducing the video data Vj in FIG. 1 is $TcVj+a \times Ts$, and a time necessary for reproducing the video data Vj+1 is $TcV(+1)+a \times Ts$. When these are inserted into the formula showing the condition for realizing post-record editing focusing on video data, that is, $$2 \times TI \geq Tf(j) + 2 \times Tfv + TcVj + TcV(j+1) + 2 \times 2 \times TA,$$

the following inequality is obtained.

$$2 \times TI \geq \{Tf(j) + 2 \times Tfv + (a+2 \times b) \times 2 \times Ts + TcVj(j+1) + 2 \times 2 \times N \times TcA\}.$$

Furthermore, when the bit rate of recording or reproduction on/from the disk is taken as Vt, the following equations are obtained.

$$TcVj = TI \times VdVj/Vt$$

$$TcV(j+1) = TI \times VdV(j+1)/Vt$$

$$TcA = TI \times VdA/Vt$$

When these are inserted into the condition formula and arranged, the following formula is obtained.

$$TI \geq (Tf(j) + 2 \times Tfv + (a+2 \times b) \times 2 \times Ts) \times Vt/(2 \times Vt - VdVj - VdV(j+1) - 2 \times 2 \times N \times VdA)$$

This is the formula showing the condition for realizing post-record editing in the same area on two pairs in succession. It should be noted that the above formula is a formula in the case where the video data sets Vj and Vj+1 have different bit rates, that is, video data has a variable bit rate. On the other hand, in the case where video data has a fixed bit rate, when the bit rate of video data is taken as VdV, the formula can be replaced by using $VdVj = VdV(j+1) = VdV$, and
$TI \geq (Tf(j) + 2 \times Tfv + (a+2 \times b) \times 2 \times Ts) \times Vt/(2 \times Vt - 2 \times VdV - 2 \times 2 \times N \times VdA)$ is obtained. This is the formula showing the condition for realizing post-record editing in the same area on two pairs in succession in the case where video data has a fixed bit rate.

In the description up to this point, the condition for realizing post-record editing in the same area on two pairs in succession has been found, but it is also possible to perform post-record editing in the same area on M pairs in succession where M is an integer of 2 or larger. This method will be described with reference to FIG. 8.

Figure 8:
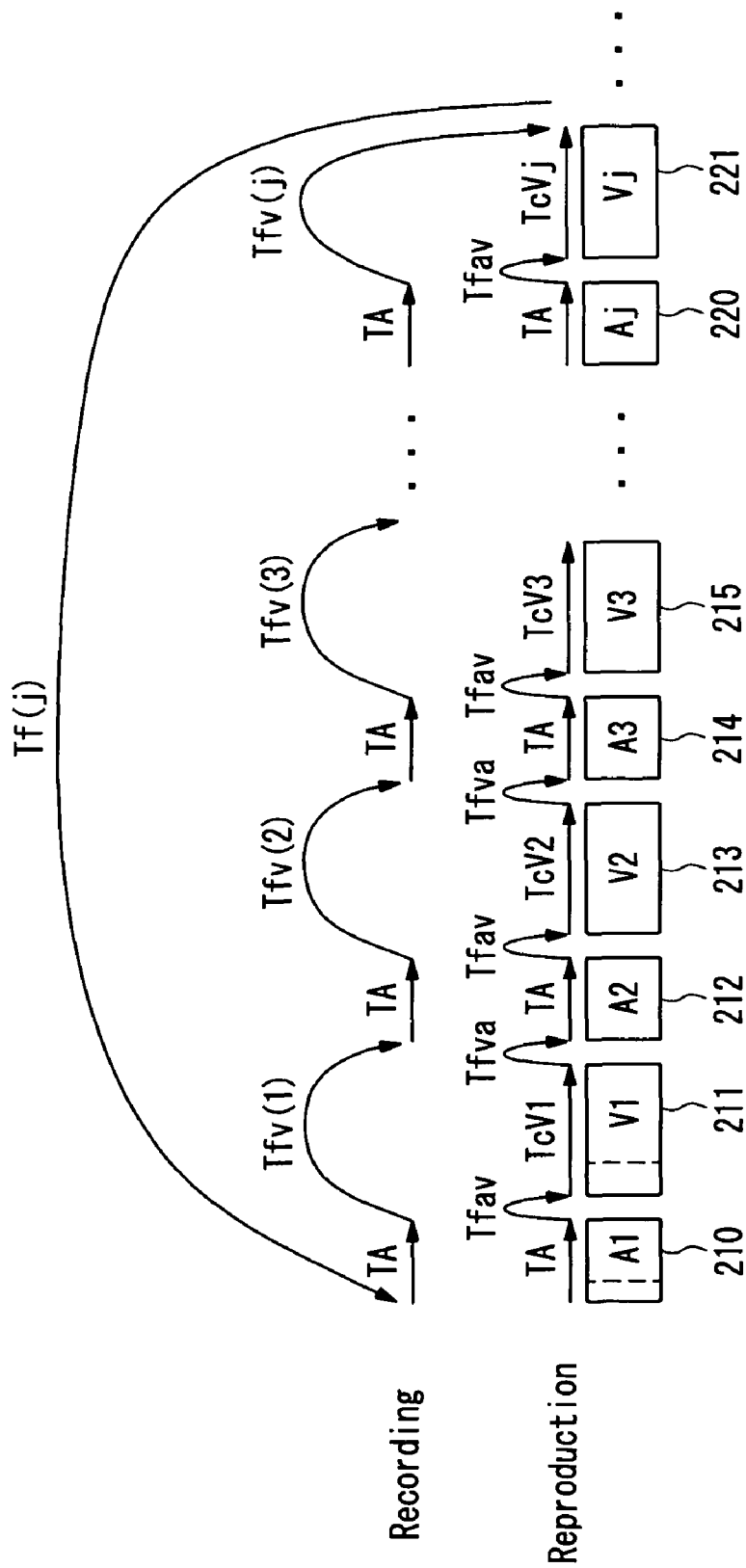
FIG. 8 is a diagram showing a method for performing post-record editing in the same area on M pairs in succession according to one embodiment of the present invention.
Figure 9:
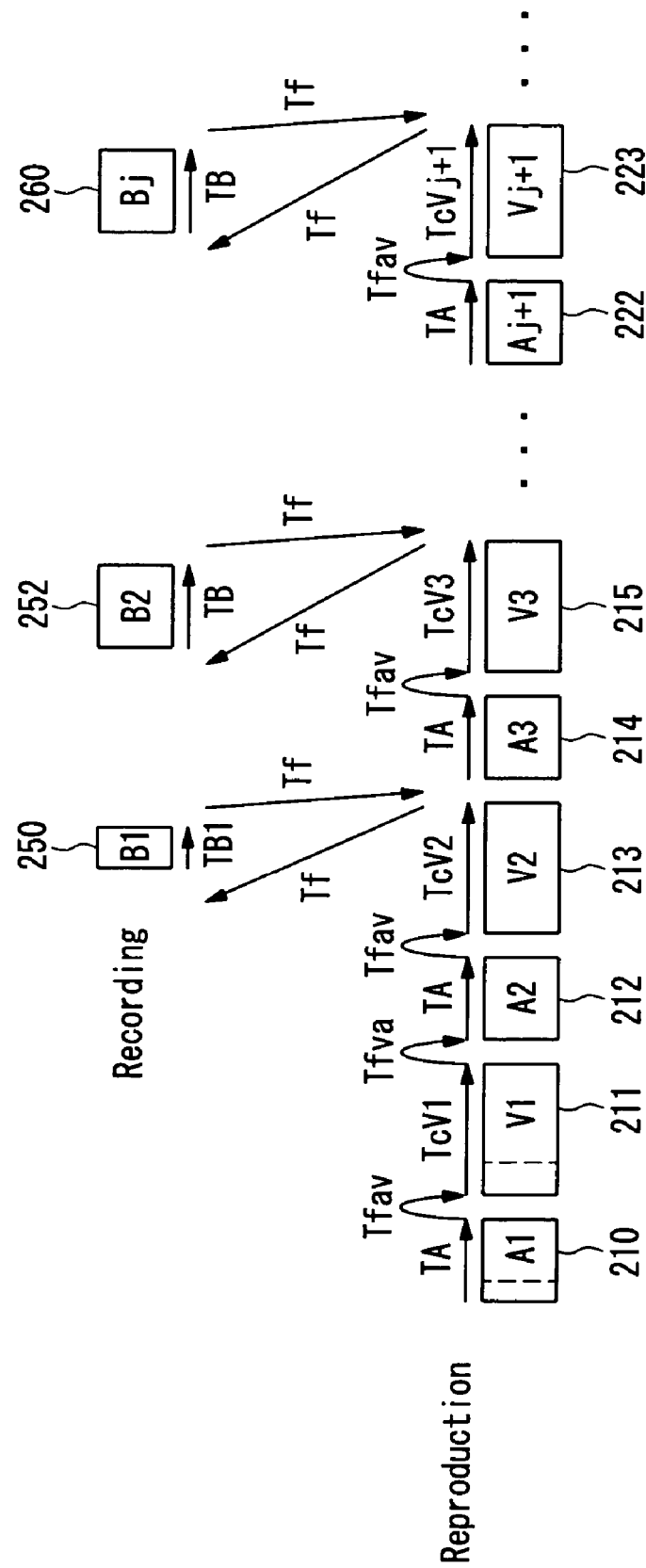
FIG. 9 is a diagram showing one example of conventional methods for performing post-record editing in a separate area.

FIG. 8 is a diagram showing a method for performing post-record editing in the same area on M pairs in succession. In FIG. 8, recording areas 210 to 215 and 220 to 221 are the same as those described in FIG. 3.

In FIG. 8, after the audio data A1 is reproduced, the video data V1 is accessed, and the video data V1 is reproduced. Then, instead of recording post-record data, the next audio data A2 is accessed. Then, the audio data A2 is reproduced, and the video data V2 is reproduced. Pairs of audio data and video data are reproduced in succession in this manner, and after data up to the audio data Aj and the video data Vj in the M-th pair is reproduced, the audio data A1 is accessed in order to record the post-record data. Then, the post-record data is recorded onto the audio data A1, and the next audio data A2 is accessed, and the post-record data is recorded thereonto. Subsequently, these processes are repeated, and after post-record recording onto the M-th audio data Aj is ended, the next reproduction data is accessed.

As described above, in this embodiment, after M pairs of audio data and video data are reproduced, M sets of audio data are recorded in post-recording, and this post-record editing is defined as one cycle and repeated. In order to find the condition for realizing post-record editing in the same area on M pairs in succession, the formula showing the condition for realizing post-record editing in the same area on two pairs in succession is generalized based on M, and thus $$TI \geq (Tf(j) + M \times Tfv + (a+2 \times b) \times M \times Ts) \times Vt/(M \times Vt - \Sigma(VdVk) - 2 \times M \times N \times VdA) \text{ is obtained, where}$$

$\Sigma$: k=1 to M.

This is the formula showing the condition for realizing post-record editing in the same area on M pairs in succession. This formula is a formula in the case where the bit rate is different for each video data, that is, video data has a variable bit rate. In the formula, $\Sigma(VdVk)$ refers to a value obtained by adding the bit rates of M sets of video data in one cycle. In order to actually find the value of $\Sigma(VdVk)$, it is desirable to check all bit rates of M sets of video data in one cycle of the post-record editing. However, for the sake of simplicity, it is possible to calculate the value with determining the maximum bit rate of video data that is subjected to the post-record editing or the maximum bit rate of video data in one cycle. In this case, when the maximum bit rate of video data is taken as VdVmax, $\Sigma(VdVk) = M \times VdVmax$ is obtained, and thus the calculation of the condition formula becomes easy. As a result, the formula showing the condition for realizing post-record editing in the same area on M pairs in succession in the case where the bit rate is variable can be expressed as $$TI \geq (Tf(j) + M \times Tfv + (a+2 \times b) \times M \times Ts) \times Vt/(M \times Vt - M \times VdVmax - 2 \times M \times N \times VdA).$$

On the other hand, in the case where video data has a fixed bit rate, when the bit rate of video data is taken as VdV, since $\Sigma(VdVk)$ in the formula is a value obtained by adding the bit rates with k=1 to M, $\Sigma(VdVk)$ can be replaced by $M\Sigma VdV$, and thus
$TI \geq (Tf(j) + M \times Tfv + (a+2 \times b) \times M \times Ts) \times Vt/(M \times Vt - M \times VdV - 2 \times M \times N \times VdA)$ is obtained.

This is the formula showing the condition for realizing post-record editing in the same area on M pairs in succession in the case where video data has a fixed bit rate. This formula is the same as the formula with a variable bit rate if VdVmax is expressed as VdV, and thus this formula corresponds to a formula uniformly expressing the cases of a variable bit rate and a fixed bit rate.

In order to find the value of M for realizing post-record editing, it is also possible to use a formula obtained by modifying the uniformly expressed condition formula based on M. More specifically, when elements of skipping ECC blocks are omitted, so that a=b=0 results in the above formula, the following inequality is obtained.

$$M \geq (Tf(j) \times Vt)/(TI \times (Vt - VdV - 2 \times N \times VdA) - Tfv \times Vt)$$

This is the formula for finding the value of M for realizing post-record editing in the case where post-record editing in the same area is performed on M pairs in succession. When the value of M satisfying this condition formula is found within a range of an integer of 2 or larger, it is possible to realize post-record editing.

Figure 12:
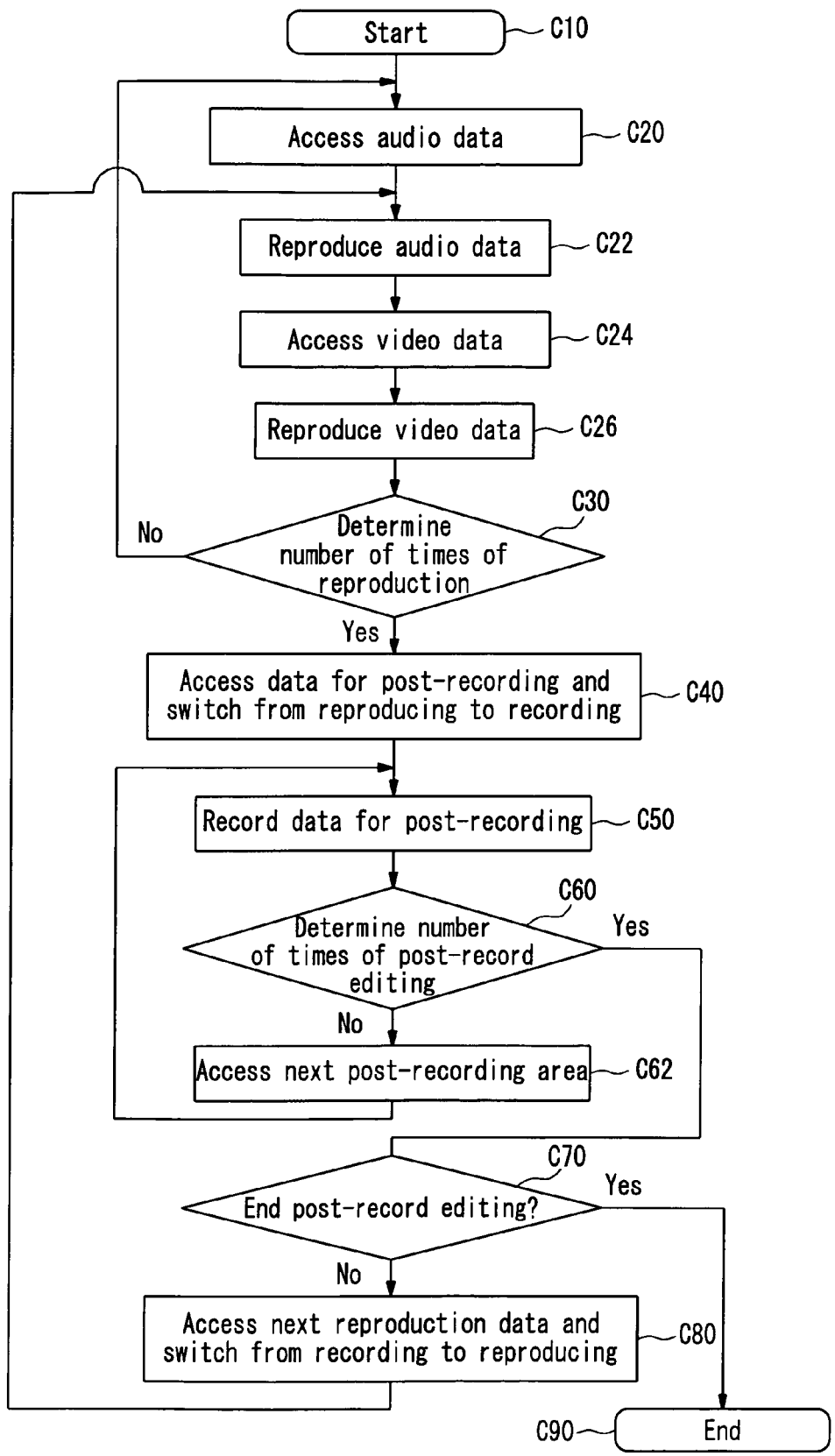
FIG. 12 is a flowchart showing the manner in which post-record editing is processed according to one embodiment of the present invention.

FIG. 12 is a flowchart showing the manner in which post-record editing is processed. The flowchart in FIG. 12 corresponds to the method for performing post-record editing in the same area on M pairs in succession shown in FIG. 8, and the following is a description with reference to FIGS. 8 and 12.

In FIG. 12, the process of post-record editing is started at a starting process C10. It is assumed that before C10 is started, reproduction of audio data and video data already has been started. When a process C20 of accessing audio data is performed in FIG. 12, the reproduction process that has been started in advance reaches the starting edge of the audio data A1 in FIG. 8. When a process C22 of reproducing the audio data is performed in FIG. 12, the audio data A1 is reproduced in FIG. 8. When a process C24 of accessing video data is performed in FIG. 12, access is performed from the ending edge of the audio data A1 to the starting edge of the video data V1 in FIG. 8. When a process C26 of reproducing the video data is performed in FIG. 12, the video data V1 is reproduced in FIG. 8. By this time point, one pair of audio data and video data has been reproduced, and a determination process C30 of the number of times of reproduction is performed in FIG. 12. In C30, the number of pairs on which reproduction has been completed and the value of M in the case where post-record editing is performed on M pairs in succession are compared. Herein, M is an integer of 2 or larger, and if the number of pairs on which reproduction has been completed is smaller than M in C30, the process is returned to C20. When the process C20 of accessing audio data is performed, access is performed from the ending edge of the video data V1 to the starting edge of the audio data A2 in FIG. 8. Subsequently, when the processes C22, C24 and C26 are performed in FIG. 12, the audio data A2 and the video data V2 are reproduced in FIG. 8. Then, similar processes are repeated until the condition in the determination process C30 of the number of times of reproduction is satisfied in FIG. 12. Assuming that M pairs of audio data and video data have been reproduced in total when data up to the audio data Aj and the video data Vj is reproduced in FIG. 8, the comparison condition is satisfied in the determination process C30 in FIG. 12, and thus post-record data is accessed and a switching process from reproducing to recording is performed in a next process C40. In this process, access is performed from the ending edge of the video data Vj to the starting edge of the audio data A1 in FIG. 8, and a switching process from reproducing to recording is performed in the device. When a process C50 of recording the post-record data is performed in FIG. 12, the post-record data is recorded onto the audio data A1 in FIG. 8. By this time point, post-record data has been recorded once. Next, a determination process C60 of the number of times of post-record editing is performed in FIG. 12. In the determination process C60 of the number of times of post-record editing, the number of times that post-record data is recorded and the value of M in the case where post-record editing is performed M times in succession are compared. Herein, M is an integer of 2 or larger, and is the same value as M used in the comparison in the determination process C30 of the number of times of reproduction. In the determination process C60 of the number of times of post-record editing, if the number of times that post-record data is recorded is smaller than M, a process C62 of accessing the next post-recording area is performed. When C62 is performed, access is performed from the ending edge of the audio data A1 to the starting edge of the next audio data A2 in FIG. 8. Then, the process is returned from C62 to C50 in FIG. 12, and the process C50 of recording post-record data is performed. In this process, post-record data is recorded onto the audio data A2 in FIG. 8. By this time point, post-record data has been recorded twice. Next, the determination process C60 of the number of times of post-record editing is performed again in FIG. 12. Subsequently, similar processes are repeated until the determination condition in C60 is satisfied. Assuming that the number of times that post-record data is recorded reaches M when post-record data is recorded onto data up to the audio data Aj in FIG. 8, the comparison condition in the determination process C60 is satisfied in FIG. 12, and thus the process proceeds on to a next process C70. In the determination process C70 of ending post-record editing, it is determined whether or not the entire post-record editing is ended. If the post-record editing is still continued, the process is diverged into a next C80. In the process C80, the next reproduction data is accessed and a switching process from recording to reproducing is performed. In this process, access is performed from the ending edge of the audio data Aj to the starting edge of the next reproduction data in FIG. 8. The next data refers to audio data and video data following the video data Vj, although they are not shown in FIG. 8. In addition to this access, a switching process from recording to reproducing is performed in the device.

The processes up to this point correspond to one cycle in the method for performing post-record editing. In one cycle of the processes, M pairs of audio data and video data are reproduced, and then post-record data is recorded M times in succession. In FIG. 12, after the process C80 is performed, the process is returned to C22 of reproducing audio data. Subsequently, this one cycle of the processes is repeated. When all of the post-record editing is ended, a determination is performed in the determination process C70 of ending post-record editing, the process proceeds on to an ending process C90, and then the entire post-record editing is ended.

When post-record editing is close to the end, the number of audio data sets or video data sets may be smaller than the repetition number M, and thus a determination may be performed in the determination processes C30 and C60, not only by comparing the number of times with M, but also giving consideration as to whether or not the post-record editing is close to the end.

Figure 15:
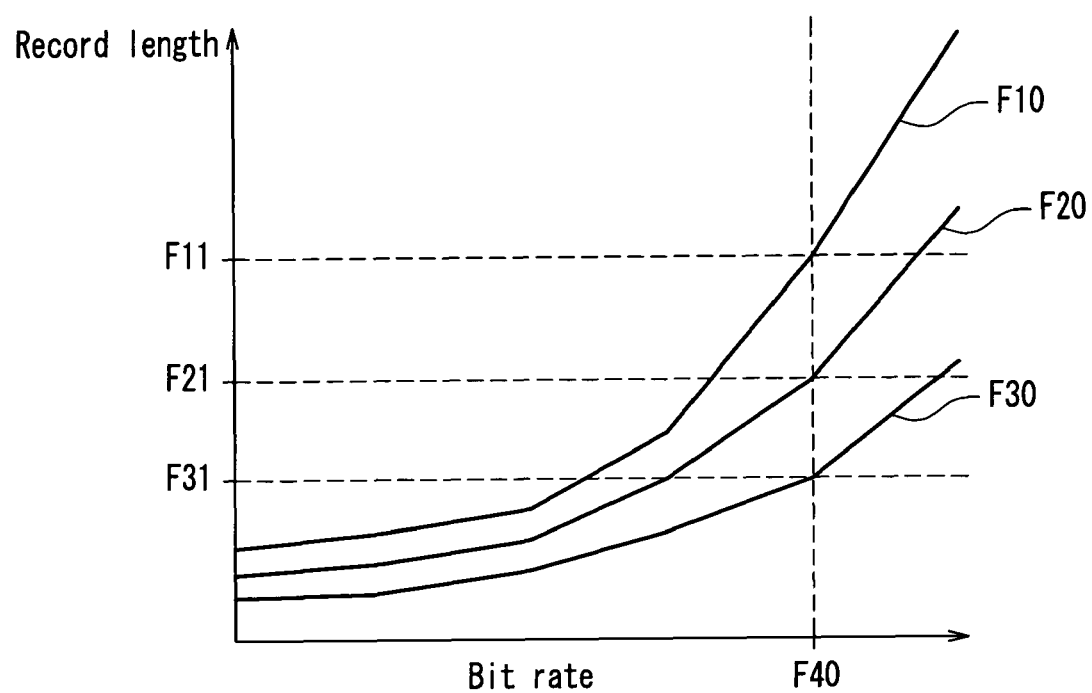
FIG. 15 is a diagram showing graphs of the formula showing the condition for realizing post-record editing according to one embodiment of the present invention.

FIG. 15 is a diagram showing graphs of the formula showing the condition for realizing post-record editing. In FIG. 15, the horizontal axis represents the bit rate of video data, and the vertical axis represents the record length of the video data. The record length of video data refers to how many seconds of video data is recorded in one video data recording area, and the record length is expressed by the unit of time. A graph F10 shows the case where the repetition number M in post-record editing is 1, a graph F20 shows the case where M is 2, and a graph F30 shows the case where M is 3.

The graphs in FIG. 15 can be formed by inserting actual values into the formula showing the condition for realizing post-record editing in the same area on M pairs in succession, that is, $$TI \geq (Tf(j) + M \times Tfv + (a + 2 \times b) \times M \times Ts) \times Vt/(M \times Vt - \Sigma(VdVk) - 2 \times M \times N \times VdA),$$

where $\Sigma$: k=1 to M.

For example, when the below-specified values are inserted, the record length TI of the video data forms a graph with taking the bit rate VdVk of the video data as a variable.
M=2 times
N=4 channels
Tf(j)=800 msec
Tfv=100 msec
a=2
b=1
Ts=20 msec
Vt=30 Mbps
VdA=1 Mbps When the value of M is further changed to form a plurality of graphs, it is possible to find the value of M for realizing post-record editing. For example, the graph F10 with M=1, the graph F20 with M=20, and the graph F30 with M=30 are shown in FIG. 15. It is assumed that there is a disk on which post-record editing is desired, and video data and audio data have been recorded alternately for a time of a predetermined record length TIa on the disk. Furthermore, it is assumed that the bit rate of the video data on the disk is F40. In this case, in the graphs in FIG. 15, when the point at which the bit rate on the horizontal axis is F40 is found for the three graphs F10, F20, and F30, a necessary record length is obtained as F11, F21, and F31 on the vertical axis for the respective graphs. These intersecting points in the graphs have the following meanings.

First, as seen from the graph F10 with M=1, it is necessary to record data with the record length F11 or longer in order to perform post-record editing on the data with a bit rate of F40 and at a cycle of M=1. Next, as seen from the graph F20 with M=2, it is necessary to record data with the record length F21 or longer in order to perform post-record editing on the data with a bit rate of F40 and at a cycle of M=2. Then, as seen from the graph F30 with M=3, it is necessary to record data with the record length F31 or longer in order to perform post-record editing on the data with a bit rate of F40 and at a cycle of M=3. If the record length TIa on the disk on which post-record editing is desired satisfies F11>TIa>F21, the post-record editing is not realized with the repetition number M=1, and the post-record editing is realized when the post-record editing is performed with the repetition number M=2 or more. Herein, in the post-record editing with M=1, post-record data is recorded once every time when one pair of audio data and video data is reproduced, and thus this falls under the category of conventional methods. The post-record editing according to this embodiment is characterized in that post-record editing can be performed on a disk on which post-record editing cannot be realized by conventional methods in this manner, by calculating the formula showing the condition for realizing post-record editing with the repetition number M=2 or more to find the repetition number for realizing post-record editing.

There may be a limitation regarding the repetition number M depending on the size of a recording buffer or a reproduction buffer in the device. In this case, when data is recorded onto the disk, it is also possible to record video data or audio data with a record length in which post-record editing is realized at a predetermined repetition number M.

In order to calculate the condition for realizing post-record editing, a numerical value for an access time is necessary. In order to find the access time, it is also possible to use a method such as shown in FIG. 14.

Figures 14A, 14B:
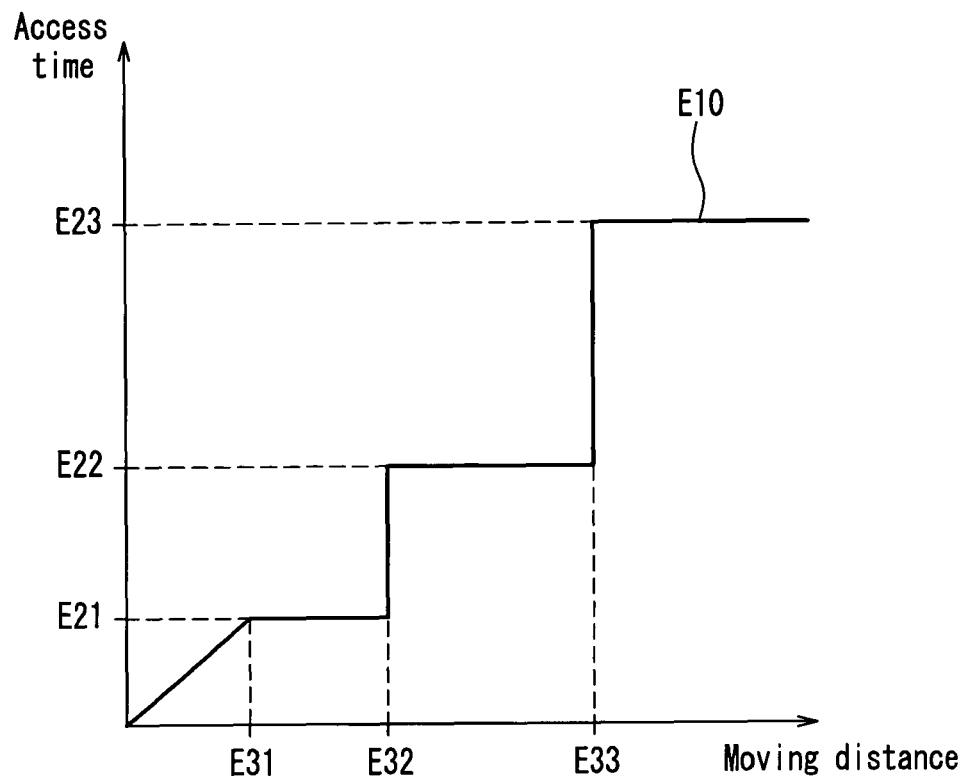
FIG. 14 includes diagrams showing an access model of the disk device.

FIG. 14 includes diagrams showing an access model of the disk device. FIG. 14A is the access graph in which the horizontal axis represents an access moving distance, and the vertical axis represents an access time. E10 is a graph that outlines an access time of the device. This graph E10 can be formed by a method by which, for example, the access performance of the disk device is measured in advance. In order to find an access time by using the access graph in FIG. 14A, first, a moving distance when access is performed from data at the starting point of the movement to data at the destination point of the movement on the disk is calculated. A moving distance can be calculated based on, for example, address information of data at the starting point of the movement and data at the destination point of the movement. When the movement distance is obtained, the corresponding moving distance is searched on the horizontal axis in the access graph in FIG. 14A, and the value on the vertical axis at the intersecting point between the moving distance and E10 is the access time. For example, when an access distance is shown as a value of E33 on the horizontal axis in FIG. 14A, the access time is a value of E23. In this manner, it is possible to find a desired access time by using the access graph as shown in FIG. 14A. It should be noted that the graph E10 in FIG. 14A is a graph simplified for the sake of explanation, but it is possible to calculate the condition for realizing post-record editing with high accuracy by reflecting more detailed access performance on the graph.

FIG. 14B shows an access table in which the horizontal fields Sr1, Sr2, Sr3, and Sr4 represent a present position on a disk, and the vertical fields Dr1, Dr2, Dr3, and Dr4 represent a target position on the disk. In the access table in FIG. 14B, for the sake of explanation, the areas on the disk are divided into four areas based on the radius. For example, it is possible to divide the areas on the disk in such a manner that an area with a radius of shorter than 30 mm is Dr1 and Sr1, an area with a radius from 30 mm to 60 mm is Dr2 and Sr2, an area with a radius from 60 mm to 90 mm is Dr3 and Sr3, and an area with a radius of longer than 90 mm is Dr4 and Sr4. On the access table shown in FIG. 14B, an access time can be found as below. For example, in the case where data at the starting point of the access is in the area with a radius of shorter than 30 mm on the disk, its present position is taken as Sr1. Then, if data at the destination point of the access is in the area with a radius from 60 mm to 90 mm, its target position is taken as Dr3. When the intersecting point between Sr1 and Dr3 is found on the access table, a value of 500 msec is obtained. In this manner, it is possible to find an access time also by using the access table as shown in FIG. 14B. It should be noted that according to the access table in FIG. 14B, the area on the disk is divided into four, but it is possible to find an accurate access time by dividing the area into a larger number of areas.

Figure 13:
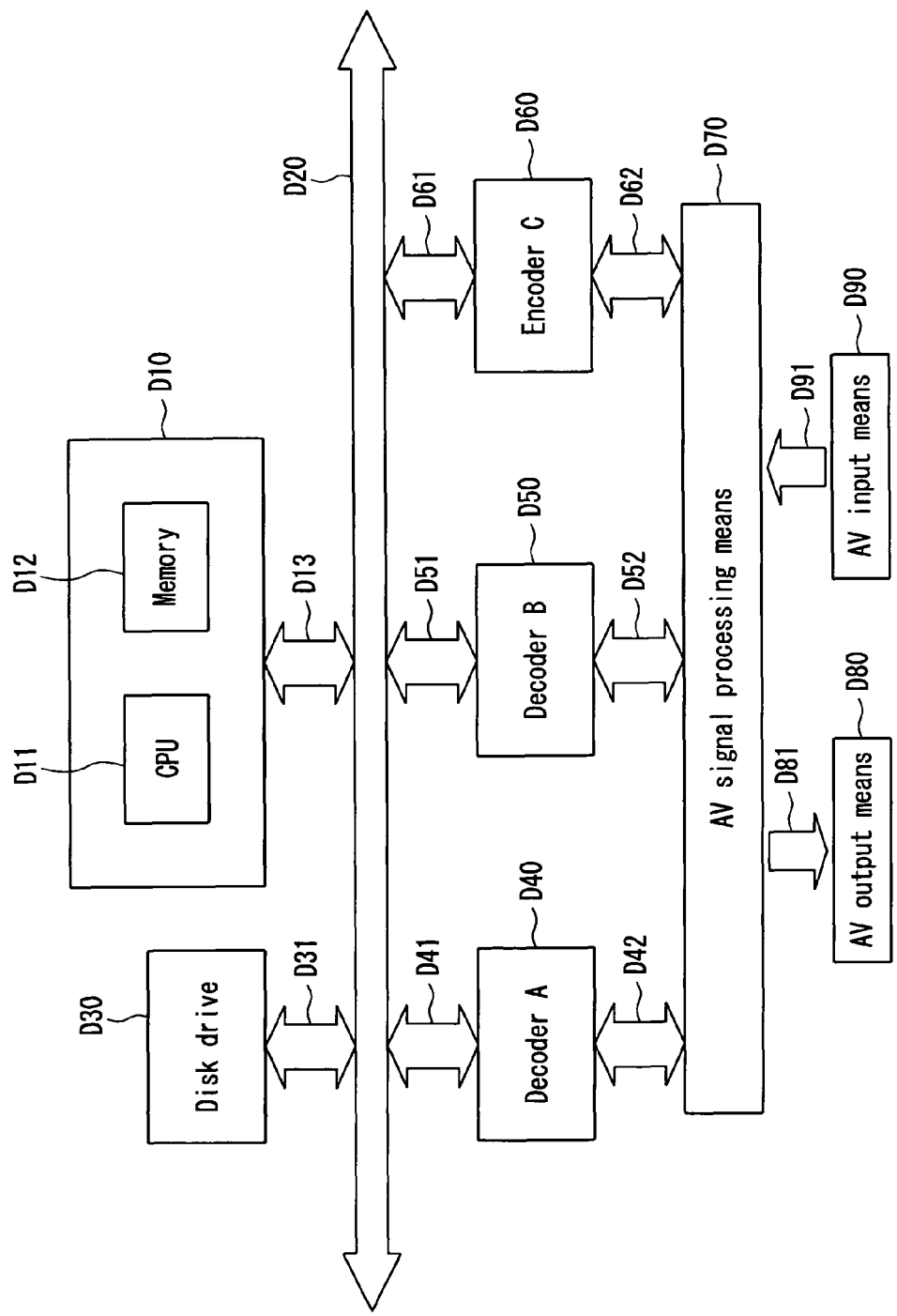
FIG. 13 is a diagram showing the structure of a recording/reproduction device according to one embodiment of the present invention.

FIG. 13 is a diagram showing the structure of a recording/reproduction device (editing device) according to one embodiment of the present invention. In FIG. 13, D10 denotes control means, D11 denotes a CPU, D12 denotes memory means, D20 denotes bus means, D30 denotes disk drive means, D40 denotes decoder A means, D50 denotes decoder B means, D60 denotes encoder C means, D13, D31, D41, D51 and D61 denote interface means connecting each of the means and the bus means, D70 denotes AV signal processing means, D42, D52 and D62 denote interface means connecting each of the means and the AV signal processing means, D80 denotes AV output means, D90 denotes AV input means, D81 and D91 denote interface means connecting each of the means and the AV signal processing means.

Hereinafter, the operation of the thus configured recording/reproduction device of this embodiment will be described. Video data that has been read out by the disk drive means D30 is transferred via the bus means D20 to the decoder A means D40 and decoded. Audio data that has been read out by the disk drive means D30 is transferred via the bus means D20 to the decoder B means D50 and decoded. The decoded data is transferred to the AV signal processing means D70, undergoes a synchronization process between video and audio or a necessary signal process, and is output to the AV output means D80. While the video and the audio are reproduced in this manner, video or audio for which post-record editing is desired is input from the AV input means D90. The AV signal processing means D70 combines the video or the audio that has been input from the AV input means D90 and the audio data or the video data that has been reproduced from the disk, processes them, and transfers the obtained data to the encoder C means D60. The post-record data that has been encoded by the encoder C means D60 is transferred via the bus means D20 to the disk drive means D30 and recorded onto the disk. The control means D10 controls these operations in post-record editing. Furthermore, when post-record editing is started, the control means D10 calculates the condition for realizing post-record editing, and controls the post-record editing based on the result of the calculation. In FIG. 13, two decoder means and one encoder means are shown, but the number of these means may be increased, if necessary.

In the above description, a method for performing post-record editing in the same area has been described in Embodiment 1. In post-record editing in the same area, the post-record editing is realized more easily by increasing M. However, in FIG. 8, if M is increased too excessively, the access time Tf(j) from the ending edge of the video data Vj to the starting edge of the audio data A1 is increased. It means that an access distance for returning to an area into which post-record data is recorded is increased, and the access distance may exceed the range of fine seek if M is increased too excessively. If the access distance exceeds the range of fine seek, the access time Tf(j) is increased drastically, and thus the post-record editing is difficult to realize. In this manner, in the case of post-record editing in the same area, when M is increased within a range in which post-record editing is realized, the post-record editing is realized more easily if the upper limit of M is set so that access is performed within the range of fine seek.

Furthermore, when M is increased, the amount of post-record data that is to be recorded in succession in one cycle of the post-record editing is increased, and thus it is necessary to consider the size of a recording buffer. When audio data for Na channels is recorded in post-recording, the amount of post-record data that is to be recorded in succession in one cycle of the post-record editing is $M \times TI \times Na \times VdA$. When the size of a recording buffer is taken as Bc, the condition under which the recording buffer does not overflow in one cycle of the post-record editing can be expressed as $$Bc \geq M \times TI \times Na \times VdA.$$

When this formula is modified based on M, the following formula is obtained.

$$M \geq Bc/(TI \times Na \times VdA)$$

This is the upper limit of M that does not cause overflow in a recording buffer in one cycle of the post-record editing.

In this manner, when M for realizing post-record editing is found, it is preferable that M is found giving consideration to the upper limit of M that is within the range of fine seek and the upper limit of M that does not cause overflow in a recording buffer, as well as the lower limit of M in the formula showing the condition for realizing post-record editing.

In Embodiment 1 of the present invention, the condition for realizing post-record editing for one cycle is calculated when one cycle is constituted by processes of reproducing M pairs of audio data and video data, and then recording M sets of audio data in post-recording into the same areas. When M is increased within the range that satisfies this condition formula, the effect is achieved that post-record editing is realized more easily.

Embodiment 2

Figure 10:
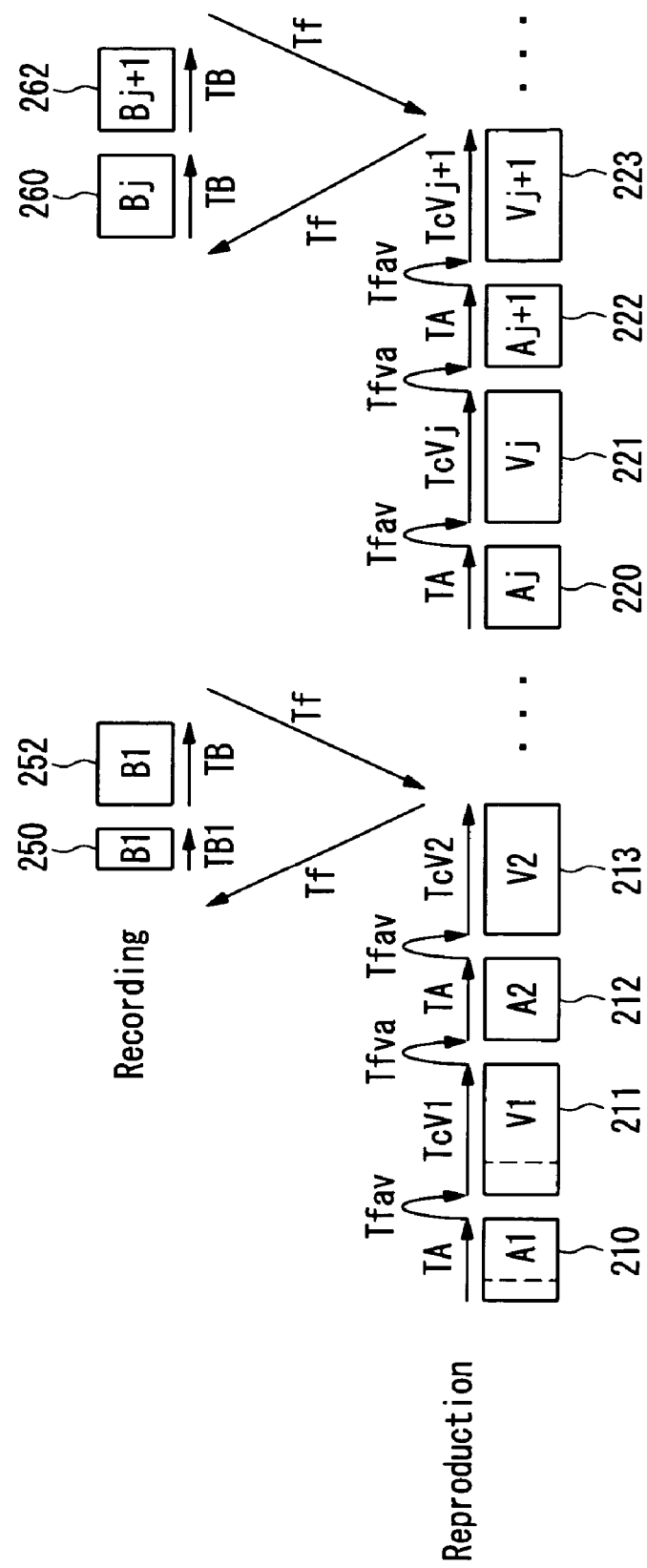
FIG. 10 is a diagram showing a method for performing post-record editing in a separate area (additional sequence) according to one embodiment of the present invention.

Hereinafter, Embodiment 2 of the present invention will be described. FIG. 10 is a diagram showing a method for performing post-record editing in a separate area (referred to as an additional sequence later) in a recording/reproduction device according to this embodiment. In FIG. 10, recording areas 210 to 213 and 220 to 223 are the same as those described in FIG. 1. Data up to the audio data A1, the video data V1, the audio data A2 and the video data V2 is reproduced in the same manner as in FIG. 1. In FIG. 10, original audio data Ai, video data Vi, and post-record audio data Bi correspond to each other in the same real-time. Furthermore, the schematic configuration of the recording/reproduction device according to this embodiment is similar to that shown in FIG. 6. It should be noted that the following procedure of post-record editing is realized by the control portion 650 controlling an operation of the pick-up 610.

In FIG. 10, recording areas including the areas 210 to 223 and others and recording areas including the areas 250 to 262 and others are arranged apart from each other on the recording medium. Hereinafter, the recording areas including the areas 210 to 223 and others are referred to as a main sequence, and the recording areas including the areas 250 to 262 and others are referred to as an additional sequence. In the main sequence, audio data and video data in a combination in which their areas are arranged alternately and adjacently, such as the area 210 and the area 211, and the area 212 and the area 213, correspond to each other in the same real-time. In the main sequence, the data unit (recording areas) including a combination of audio data and video data that correspond to each other in the same real-time in this manner is defined as one data block. More specifically, the area 210 and the area 211 are treated as one data block, for example. On the other hand, in the additional sequence, for example, the area 250 corresponds to the data block including the area 210 and the area 211 in the main sequence in the same real-time, and the recording area 252 corresponds to the data block including the area 212 and the area 213 in the main sequence in the same real-time. In the additional sequence, each of the area 250, the area 252 and others is treated as one data block.

In post-record editing in a separate area (additional sequence), after data up to the video data V2 in the main sequence is reproduced completely, a separate area (additional sequence) on the disk is accessed in order to record post-record data. In FIG. 10, this access is shown as access from the ending edge of the video data V2 to the starting edge of the audio data recording area 250 in the separate area (additional sequence) and the access takes the time Tf. The post-record audio data B1 is recorded into the audio data recording area 250 in the separate area (additional sequence), and the post-record audio data B2 is recorded into the audio data recording area 252 in the separate area (additional sequence). Then, access is performed from the ending edge of the audio data recording area 252 in the separate area (additional sequence) to the starting edge of the next reproduction data in the main sequence in the time Tf.

This post-record editing is defined as one cycle, and then similar processes are repeated in the post-record editing in a separate area (additional sequence) according to this embodiment. This one cycle of the repetitive processes is applied to the recording areas 220 to 223 in FIG. 10, and times necessary for processing one cycle are listed as below following the order of the process; the reproduction time TA of the audio data Aj, the access time Tfav from the ending edge of the audio data Aj to the starting edge of the video data Vj, the reproduction time TcVj of the video data Vj, the access time Tfva from the ending edge of the video data Vj to the starting edge of the audio data Aj+1, the reproduction time TA of the audio data Aj+1, the access time Tfav from the ending edge of the audio data Aj+1 to the starting edge of the video data Vj+1, the reproduction time TcV(j+1) of the video data Vj+1, the access time Tf from the ending edge of the video data Vj+1 to the starting edge of the audio data recording area 260 in the separate area (additional sequence), the recording time TB of the post-record audio data Bj, the recording time TB of the post-record audio data Bj+1, and then the access time Tf from the ending edge of the audio data recording area 262 in the separate area (additional sequence) to the starting edge of the next reproduction data. It should be noted that the access time Tf from the ending edge of the video data Vj+1 to the starting edge of the audio data recording area 260 in the separate area (additional sequence) includes the process time for switching from reproducing to recording, and the access time Tf from the ending edge of the audio data recording area 260 in the separate area (additional sequence) to the starting edge of the next reproduction data in the main sequence includes the process time for switching from recording to reproducing.

In the above description, one cycle includes processes in which two pairs (data blocks) of audio data and video data are reproduced in succession, and then post-record audio data is recorded in post-recording in succession into two data blocks in a separate area (additional sequence). Furthermore, it is assumed that the audio data recording areas 260 and 262 in the separate area (additional sequence) can be recorded in succession on the disk, but when there is other data between the two areas, it is also possible to add an appropriate access time between a time when the post-record audio data Bj is recorded and a time when the post-record audio data Bj+1 is recorded. The time for processing one cycle of post-record editing in a separate area (additional sequence) is calculated by adding the above-described process times and is expressed by the following formula.

(Time for processing one cycle when post-record editing in a separate area (additional sequence) is performed on two pairs (two data blocks) in succession)=$TA+Tfav+TcVj+Tfva+TA+Tfav+TcV(j+1)+Tf+TB+TB+Tf$ Herein, when audio data and video data are arranged adjacent to each other and recorded in succession, Tfav and Tfva are ignored as 0. Furthermore, in a similar manner to the description of FIGS. 4 and 5, when it is assumed that all audio channels are traced, and thus TB=TA results also while post-record audio data is recorded into a separate area (additional sequence), the following formula is obtained.

(Time for processing one cycle when post-record editing in a separate area (additional sequence) is performed on two pairs (two data blocks) in succession)=$2\times Tf+TcVj+TcV(j+1)+2\times 2\times TA$ Herein, in a similar manner to the post-record editing in the same area described with reference to FIG. 1, the condition regarding video data to realize post-record editing will be found as data whose bit rate is the highest. In the case where post-record editing in a separate area (additional sequence) is performed on two pairs (two data blocks) in succession as described in FIG. 10, when the data amount of the video data Vj is taken as YVj, and the data amount of the video data Vj+1 is taken as YV(j+1), the size of video data that is reproduced from the disk is the total of these, that is, YVj+YV(j+1) and this sized data is accumulated in the reproduction buffer for video data. This accumulated data is consumed by the decoder at the bit rate of video data. In consideration of a variable bit rate, the bit rate of the video data Vj is taken as VdVj, and the bit rate of the video data Vj+1 is taken as VdV(j+1), and thus a time until data in the reproduction buffer for video data has been consumed by the decoder and the buffer becomes empty is $YVj/VdVj+YV(j+1)/VdV(+1)$.

If this time is not shorter than the above-calculated time for processing one cycle of post-record editing, it is possible to perform post-record editing for one cycle while the reproduction buffer for video data does not become empty. This is the condition for performing post-record editing for one cycle, regarding the reproduction buffer for video data. When the record length of video data is taken as TI, a time until data in the reproduction buffer for video data has been consumed by the decoder and the buffer becomes empty is expressed as 2×TI. If the time for processing one cycle of post-record editing is shorter than this time, the post-record editing is carried out. Thus, the condition for realizing post-record editing focusing on video data is 2×TI≧(time for processing one cycle when post-record editing in a separate area (additional sequence) is performed on two pairs (two data blocks) in succession).

When the above-described formula is inserted into this, the following inequality is obtained.

$2\times TI \geq 2\times Tf+TcVj+TcV(j+1)+2\times 2\times TA$

As seen from the description of FIGS. 4 and 5, when a time for reading out one ECC block is taken as Ts, the number of ECC blocks that are skipped in the video data as "a", and the number of ECC blocks that are skipped in the audio data including data of another kind as "b", the process time TA that is necessary to record audio data in post-record editing can be expressed as $TA=N\times TcA+b\times Ts$.

Furthermore, in FIG. 10, a time necessary for reproducing the video data Vj is TcVj+a×Ts, and a time necessary for reproducing the video data Vj+1 is TcV(j+1)+a×Ts. When these are inserted, the following inequality is obtained.

$2\times TI \geq \{2\times Tf+(a+2\times b)\times 2\times Ts+TcVj+TcV(j+1)+2\times 2\times N\times TcA\}$ Furthermore, when the bit rate of recording or reproduction onto/from the disk is taken as Vt, the bit rate of the video data Vj as VdVj, the bit rate of the video data Vj+1 as VdV(j+1), and the bit rate of audio data as VdA, the following equations are obtained.

$TcVj=TI\times VdVj/Vt$ $TcV(j+1)=TI\times VdV(j+1)/Vt$ $TcA=TI\times VdA/Vt$

When these are inserted into the condition formula and arranged, the following formula is obtained.

$TI \geq (2\times Tf+(a+2\times b)\times 2\times Ts)\times Vt/(2\times Vt-VdVj-VdV(j+1)-2\times 2\times N\times VdA)$ This is the formula showing the condition for realizing post-record editing in a separate area (additional sequence) on two pairs (two data blocks) in succession.

Furthermore, in the description up to this point, the condition for realizing post-record editing in a separate area (additional sequence) on two pairs (two data blocks) in succession has been found, but it is also possible to perform post-record editing in a separate area (additional sequence) on M pairs (M data blocks) in succession where M is an integer of 2 or larger. This method will be described with reference to FIG. 11.

Figure 11:
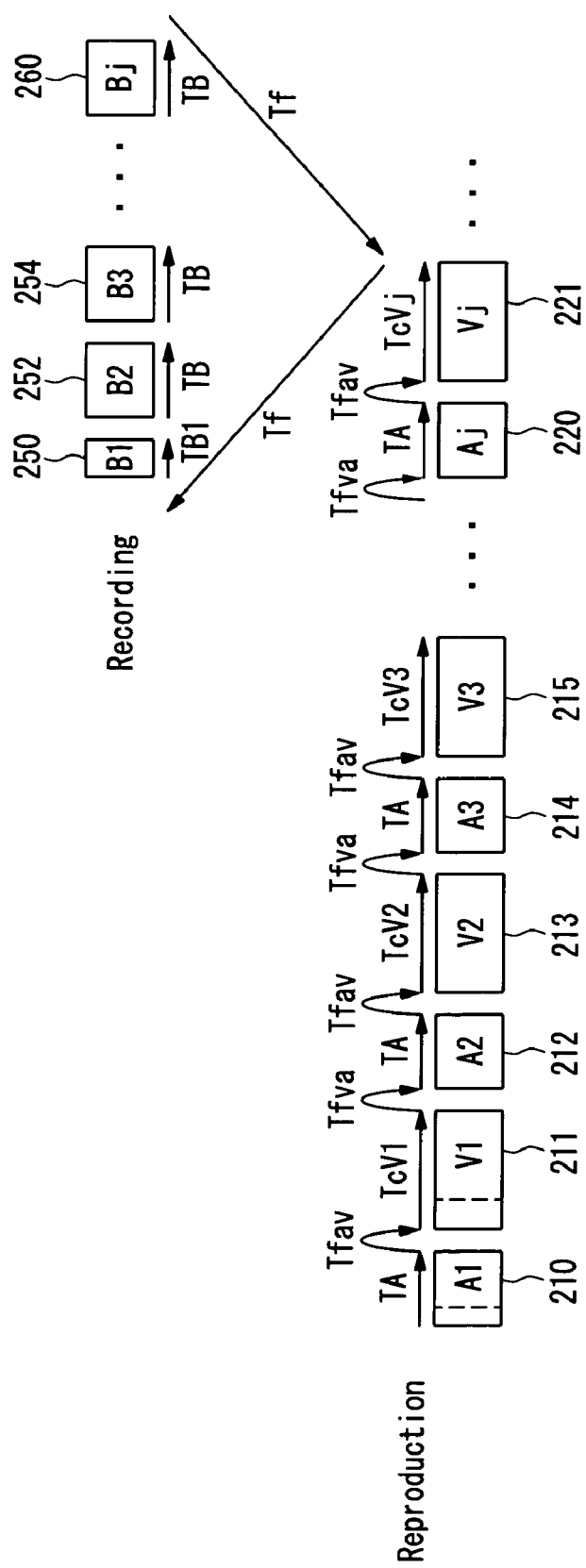
FIG. 11 is a diagram showing a method for performing post-record editing in a separate area (additional sequence) on M pairs in succession according to one embodiment of the present invention.

FIG. 11 is a diagram showing a method for performing post-record editing in a separate area (additional sequence) on M pairs (M data blocks) in succession. In FIG. 11, recording areas 210 to 215 and 220 to 221 are the same as those described in FIG. 8. Furthermore, data up to the audio data A1, the video data V1, the audio data A2, the video data V2, the audio data A3 and the video data V3 is reproduced in the same manner as in FIG. 8. In FIG. 11, original audio data Ai, video data Vi, and post-record audio data Bi correspond to each other in the same real-time.

In FIG. 11, recording areas including the areas 210 to 221 and others and recording areas including the areas 250 to 260 and others are arranged apart from each other on the recording medium. The recording areas including the areas 210 to 221 and others are referred to as a main sequence, and the recording areas including the areas 250 to 260 and others are referred to as an additional sequence. In the main sequence, audio data and video data in a combination in which their areas are arranged alternately and adjacently, such as the area 210 and the area 211, and the area 212 and the area 213, correspond to each other in the same real-time. In the main sequence, the data unit (recording areas) including a combination of audio data and video data that correspond to each other in the same real-time in this manner is defined as one data block. More specifically, the area 210 and the area 211 are treated as one data block, for example. On the other hand, in the additional sequence, for example, the area 250 corresponds to the data block including the area 210 and the area 211 in the main sequence in the same real-time, and the recording area 252 corresponds to the data block including the area 212 and the area 213 in the main sequence in the same real-time. In the additional sequence, each of the area 250, the area 252 and others is treated as one data block.

In post-record editing in a separate area (additional sequence) on M pairs (M data blocks) in succession, M pairs (data blocks) of audio data and video data are reproduced. In FIG. 11, when it is assumed that data in the M-th pair (M-th data block) is the audio data Aj and the video data Vj, data up to the video data Vj is reproduced, and then the audio data recording area 250 in the separate area (additional sequence) is accessed in order to record post-record data. The post-record audio data B1 is recorded into the audio data recording area 250 in the separate area (additional sequence), and the post-record audio data B2 is recorded into the audio data recording area 252 in the separate area (additional sequence). Subsequently, these processes are repeated, and after recording of the post-record audio data Bj into the audio data recording area 260 in the M-th data block is ended, the next reproduction data in the main sequence is accessed.

As described above, in this embodiment, after M pairs (data blocks) of audio data and video data are reproduced, post-record audio data corresponding to these M sets of video data is recorded in post-recording into audio data recording areas for M blocks in the separate area (additional sequence), and this post-record editing is defined as one cycle and repeated. In order to find the condition for realizing post-record editing in a separate area (additional sequence) on M pairs (M data blocks) in succession, the formula showing the condition for realizing post-record editing in a separate area (additional sequence) on two pairs (two data blocks) in succession is generalized based on M, and thus $$Tf \geq (2 \times Tf + (a+2\times b) \times M \times Ts) \times Vt/(M \times Vt - \Sigma(VdVk) - 2 \times M \times N \times VdA) \text{ is obtained, where}$$

$\Sigma$: k=1 to M.

This is the formula showing the condition for realizing post-record editing in a separate area (additional sequence) on M pairs (M data blocks) in succession.

The formula showing the condition for realizing post-record editing in a separate area (additional sequence) on M pairs (M data blocks) in succession is the same as the formula showing the condition for realizing post-record editing in the same area on M pairs (M data blocks) in succession if the portion of Tf(j)+M×Tfv is replaced by 2×Tf. It means that in post-record editing in the same area, the access in Tf(j) is necessary for performing post-record recording and the access in M×Tfv is necessary for skipping M sets of video data during the post-record editing, while in post-record editing in a separate area (additional sequence), the access time Tf to a separate area (additional sequence) is necessary for a round trip, that is, 2×Tf. More specifically, except for these access times, the formula showing the condition for realizing post-record editing in a separate area (additional sequence) can be treated in a similar manner to the formula showing the condition for realizing post-record editing in the same area. Therefore, also in post-record editing in a separate area (additional sequence), it is possible to find the value of M by modifying the condition formula based on M, or to find the value of M for realizing post-record editing in a separate area (additional sequence) by forming a graph in FIG. 15 as described above. Furthermore, a flowchart in the case of post-record editing in a separate area (additional sequence) can be expressed by using FIG. 12, which is a flowchart in the case of post-record editing in the same area, if the portion of access to post-record data and a switching process from reproducing to recording shown in C40 are replaced by access to a separate area (additional sequence) and a switching process from reproducing to recording, and access to the next post-recording area shown in C62 is processed with substantially no access time when there is no data between two sets of audio data in the separate area (additional sequence).

Furthermore, when the value of M is increased in the post-record editing of this embodiment, since the condition for realizing post-record editing is eased, there may be a vacant time after post-record data is recorded in one cycle. In this vacant time, a verification process of the post-record data can be performed. More specifically, it is possible that in the vacant time, post-record data that is recorded is read out and compared with the post-record data before being recorded. With this process, post-record editing can be performed reliably.

In the present invention, the repetitive processes can be performed by fixing the value of M from the start to the end of post-record editing, but it is also possible to perform post-record editing with dynamically changing M for every cycle in accordance with the data amount in a recording buffer or a reproduction buffer during the post-record editing.

Embodiment 3

Figure 16:
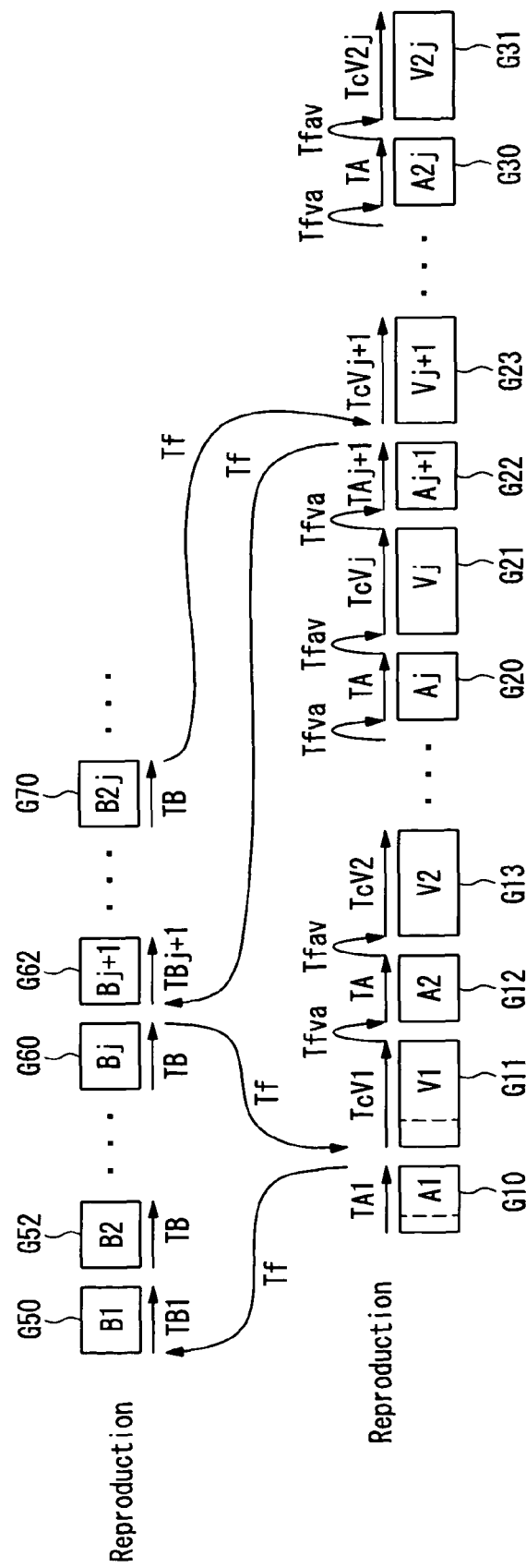
FIG. 16 is a diagram showing the order of reproduction in a recording/reproduction device according to one embodiment of the present invention.

Hereinafter, as Embodiment 3 of the present invention, the case will be described in which reproduction is performed on a recording medium on which post-record editing has been performed. FIG. 16 is a diagram showing the order of reproduction in a recording/reproduction device (editing device) according to this embodiment. It is assumed that all recording areas shown in FIG. 16 are on the same recording medium and in a state where post-record editing has been completed. Furthermore, the schematic configuration of the recording/reproduction device according to this embodiment is similar to that shown in FIG. 6. It should be noted that the following procedure of reproduction is carried out by the control portion 650 controlling an operation of the pick-up 610.

In FIG. 16, G10, G12, G20, G22, and G30 denote audio data recording areas, and G11, G13, G21, G23, and G31 denote video data recording areas. The audio data recording areas and the video data recording areas are arranged alternately and adjacently on a recording medium. Furthermore, there are a plurality of pairs of an audio data recording area and a video data recording area between G13 and G20, G23 and G30, and after G31, although they are not shown in FIG. 16.

Furthermore, in FIG. 16, G50, G52, G60, G62, and G70 denote audio data recording areas. In these audio data recording areas, additional audio data used in, for example, post-record editing is recorded. In this embodiment, these recording areas are referred to as audio data in a separate area (additional sequence), as contrasted with the recording areas (main sequence) including G10 to G31 and others. The recording areas G50 to G70 are constituted only by audio data recording areas, and there is no video data recording area between these recording areas. There are a plurality of audio data recording areas between G52 and G60, G62 and G70, and after G70, although they are not shown in FIG. 16.

The recording areas including G10 to G31 and others and the recording areas including G50 to G70 and others are arranged apart from each other on the recording medium. Hereinafter, the recording areas including G10 to G31 and others are referred to as a main sequence, and the recording areas including G50 to G70 and others are referred to as an additional sequence. In the main sequence, audio data and video data in a combination in which they are arranged alternately and adjacently, such as G10 and G11, and G12 and G13, correspond to each other in the same real-time. In the main sequence, the data unit (recording areas) including a combination of audio data and video data that correspond to each other in the same real-time in this manner is defined as one data block. More specifically, G10 and G11 are treated as one data block, for example. On the other hand, in the additional sequence, for example, the recording area G50 corresponds to the data block including G10 and G11 in the main sequence in the same real-time, and the recording area G52 corresponds to the data block including G12 and G13 in the main sequence in the same real-time. In the additional sequence, each of the recording areas G50, G52 and others is treated as one data block.

Furthermore, as described with reference to FIG. 4, the inside of one audio data recording area is divided into a plurality of areas so that audio data having a plurality of audio channels can be recorded thereinto. Herein, in FIG. 16, it is assumed that the audio data recording areas G50 to G70 correspond to the case where N=4 in FIG. 4A, and the inside of each recording area is divided into audio data recording areas for four channels, that is, ch1 to ch4. Of these, it is assumed that ch3 and ch4 are used in reproduction. More specifically, audio data in the separate area (additional sequence) is used when the audio data in the recording areas 417 and 418 is reproduced in FIG. 4A.

As described with reference to FIG. 5, an audio data recording area and a recording area for data of another kind may be arranged adjacent to each other. In particular, in the case shown in FIG. 5B, the recording area 540 for the data Lj of another kind is provided adjacently before the audio data recording area 411 for ch1. Since the data of another kind includes information relating to audio data or video data, when they are reproduced, it is also necessary to read out the data of another kind. In FIG. 16, it is assumed that the audio data recording areas G10, G12, G20, G22, and G30 correspond to the case where N=4 in FIG. 5B, the inside of each recording area is divided into audio data recording areas for four channels, that is, ch1 to ch4, and the recording area 540 for the data Lj of another kind is provided adjacently before the recording area 411 for ch1. Of these, it is assumed that the data Lj of another kind and the audio data in ch1 and ch2 are used in reproduction.

The case will be described in which reproduction is performed based on the above assumptions. In FIG. 16, first, reproduction is started from a point midway in the recording area G10. Then, at a point before the ending edge of the recording area G10, a point midway in the recording area G50 is accessed. The order of reproduction up to this point will be described with reference to FIG. 5B.

In FIG. 5B, data of another kind is recorded in the recording area 540. In view of general cases, the reproduction starting point is not necessarily equal to the head of a recording area, and thus it is assumed that the reproduction starting point is midway in the recording area 540, and the data Lj of another kind is read out from the midway point to the ending edge of the recording area 540.

Next, in FIG. 5B again, the audio data in ch1 in the recording area 411 and the audio data in ch2 in the recording area 412 are reproduced from a point midway in the recording areas. Since audio data has a small data amount, unnecessary data from the ending edge of the data Lj of another kind to the midway point (reproduction starting point) of the audio data in ch1 can be skipped by an access means such as the fine seek, but it is also possible to reach the starting point of the audio data in ch1 by rotational access without any processing.

In a similar manner, in access from the ending edge of the audio data in ch1 to the midway point (reproduction starting point) of the audio data in ch2, it is also possible to reach the reproduction starting point of the audio data in ch2 by rotational access without any processing. After data up to the ending edge of the audio data in ch2 is read out, since audio data in other channels adjacently after this recording area is not used in reproduction, access is performed from the ending edge of the audio data in ch2 to audio data in the separate area (additional sequence).

In FIG. 16, after a point midway in the recording area G50, which is an audio data recording area in the separate area (additional sequence), is accessed, data up to the ending edge of the recording area G50 is read out, and data in the recording area G52 and up to the ending edge of the recording area G62 is read out. Then, access is performed from the ending edge of the recording area G60 to a point midway in the recording area G11 in the main sequence. The order of reproduction up to this point will be described with reference to FIG. 4A.

When N=4 in FIG. 4A, the recording area 417 corresponds to the recording area for the audio data in ch3, and the recording area 418 corresponds to the recording area for the audio data in ch4. When it is assumed that the reproduction starting point of the audio data in ch3 is midway in the recording area 417, the landing point of the access to audio data in the separate area (additional sequence) is the point midway in the recording area 417, and data from the midway point to the ending edge of the audio data in ch3 is read out.

When it is assumed that the reproduction starting point of the next audio data in ch4 is midway in the recording area 418, it is possible to reach the reproduction starting point of the audio data in ch4 by rotational access in a similar manner to the above. Then, data up to the ending edge of the recording area 418 is read out.

In FIG. 16, after the data up to the ending edge of the recording area G50 is read out, data in the next recording area G52 is read out. At that time, since the inside of the recording area G52 is also constituted in a similar manner to that in FIG. 4A, the audio data in ch3 and ch4 that are necessary in reproduction are arranged in a latter portion of the recording area. The recording areas 411 and 412 in FIG. 4A include audio data that is not used in the reproduction, and it is also possible to reach the starting edge of the recording area 417 by rotational access in a similar manner to the above. Then, audio data in the recording areas 417 and 418 is read out. As a result, without performing access such as the fine seek, an operation of skipping an unnecessary data portion by rotational access and reproducing the audio data in ch3 and ch4 is repeated. Therefore, in the order of reproduction in FIG. 16, all recording areas from the starting edge of the recording area G52 to the ending edge of the recording area G60 are traced.

Furthermore, in FIG. 16, access is performed from the ending edge of the recording area G60 to a point midway in the recording area G11. The point midway in the recording area G11 refers to the position of data that is necessary for the reproduction starting point of the video data V1 in the recording area G11. For example, when video data is in a compression format such as MPEG using a frame correlation, in order to decode the frame at the reproduction starting point, it is necessary to read out data preceding the reproduction starting point by several frames. Therefore, the destination point in the access to the recording area G11 is not the reproduction starting point of the video data V1, but the head position of data that is necessary for the reproduction starting point of the video data V1. After data from the midway point to the ending edge of the recording area G11 is read out, the next recording area G12 is accessed. At that time, if there is data that is unnecessary in reproduction, from the ending edge of the video data V1 in the recording area G11 to the starting edge of the data of another kind in the recording area G12, the unnecessary data can be skipped by an access means such as the fine seek shown with the access time Tfva in FIG. 16, or can be skipped by rotational access. Furthermore, in the recording area G12, the data Lj of another kind and the audio data in ch1 and ch2 are read out as shown in FIG. 5B. Since audio data in other channels adjacently after the recording area 412 in FIG. 5B is unnecessary in recording, the data can be skipped by rotational access or by an access means such as the fine seek to reach the next data. The portion that is skipped is shown by the access time Tfav between the recording areas G11 and G12 in FIG. 16. Subsequently, data up to the recording areas G13, G20, and G21 is read out with alternately performing the skipping process.

Then, after the data of another kind and the audio data in ch1 and ch2 in the recording area G22 is read out in FIG. 16, a point midway in the audio data recording area G62 in the separate area (additional sequence) is accessed. This state will be described with reference to FIGS. 4 and 5. Since the inside of the recording area G22 in FIG. 16 corresponds to FIG. 5B, data in the recording areas 540, 411, and 412 is read out in FIG. 5B. Since audio data in other channels arranged after the recording area 412 is unnecessary in recording, after data up to the ending edge of the recording area 412 is read out, access can be performed therefrom. An audio data recording area in the separate area (additional sequence), which is the destination point of the access, corresponds to FIG. 4A. Since the recording areas 417 and 418 when N=4 in FIG. 4A include the audio data in ch3 and ch4 that are necessary in reproduction, the landing point of the access is the starting edge of the audio data in ch3 in the recording area 417 in FIG. 4A. Then, the audio data in ch3 in the recording area 417 and the audio data in ch4 in the recording area 418 are read out. In the processes up to this point, data up to the recording area G62 in FIG. 16 has been read out. After the recording area G62, data up to the recording area G70 is read out. Since the inside of the recording areas G62 to G70 corresponds to FIG. 4A, only the recording areas 417 and 418 in FIG. 4A are read out. Since the other recording areas 411 and 412 include data that is unnecessary in reproduction, these areas can be skipped by rotational access. As a result, in FIG. 16, after a point midway in the recording area G62 is accessed, all recording areas up to the ending edge of the recording area G70 are traced. After data up to the ending edge of the recording area G70 is read out in FIG. 16, the starting edge of the video data Vj+1 in the recording area G23 is accessed. Then, data from the starting edge to the ending edge of the video data Vj+1 is read out. Subsequently, similar processes to the above are repeated on the recording areas G30, G31 and the following recording areas.

In the order of reproduction as described above, in a similar manner to the case of recording in post-record editing in a separate area (additional sequence), a plurality of sets of audio data (a plurality of data blocks) in a separate area (additional sequence) are read out in succession, and a plurality of sets of audio data and video data (a plurality of data blocks) in areas in which audio data and video data are arranged alternately are also read out in succession. Thus, the number of times of access to audio data in the separate area (additional sequence) is reduced. In the reproduction processes, how many recording areas are preferably read out in succession will be described below.

In reproduction, in a similar manner to recording, data is consumed by a decoder faster as the data has a higher bit rate, and thus the condition for realizing reproduction will be focused on the condition regarding video data whose bit rate is the highest. Video data that has been read out from a recording medium is accumulated in a buffer, and the video data that has been accumulated in the buffer is consumed by a decoder for reproduction. In order not to let video in the reproduction stop, it is necessary that the buffer for the video data does not become empty during the reproduction.

In FIG. 16, reading out of the video data starts from the recording area G11. A time necessary for reading out the necessary video data in the recording area G11 is referred to as TcV1. Then, a time for accessing the necessary data in the recording area G12 is referred to as Tfva, a time for reading out the necessary data in the recording area G12 and a time for rotational access to the next data are referred to as TA. An access time from the ending edge of the recording area G12 to the starting edge of the recording area G13 is referred to as Tfav. A time for reading out the video data V2 in the recording area G13 is referred to as TcV2. In consideration of the case where video data has a variable bit rate as well, it is assumed that the data amount is different for each video data recording area, and a time for reading out the video data Vj is referred to as TcVj, by using a subscript of "j" when j is an integer of 1 or larger. A time for reading out the necessary data in the recording area G20 and a time for rotational access to the next data are also referred to as TA. A time for reading out data of the necessary portion in the recording area G22 is referred to as TA(j+1). Then, a time for accessing the necessary data in the recording area G62 is referred to as Tf. A time for reading out the necessary data in the recording area G62 and a time for rotational access to the next data are referred to as TB(j+1). Subsequently, a time for rotational access to the next data and a time for reading out the necessary data are each referred to as TB up to the recording area G70. Then, an access time from the ending edge of the necessary data in the recording area G70 to the starting edge of the necessary data in the recording area G23 is referred to as Tf. A time for reading out the necessary data in the recording area G23 is referred to as TcV(j+1).

In the above process times, when a time necessary for reading out video data is taken as Tsv, Tsv can be expressed by the following formula $$Tsv = TcV1 + TcV2 + \ldots + TcVj + TcV(j+1) = \Sigma(TcVi),$$
where $\Sigma$: $i=1$ to $(j+1)$.

Furthermore, in FIG. 16, during a period between a time when reading out of the video data V1 is started and a time when reading out of the video data V(j+1) is ended, when a process time that is necessary for processes other than reading out of video data is taken as Tnv, Tnv is a time obtained by adding times for reading out data of another kind and audio data, times for rotational access, and access times in this period, and thus Tnv can be expressed by the following formula.

$$Tnv = Tfva + TA + Tfav + \ldots + Tfva + TA + Tfav + Tfva + TA(j+1) + Tf + TB(j+1) + TB + \ldots TB + Tf.$$

When the formula is arranged, the following equation is obtained.

$$Tnv = Tfva \times j + TA \times (j-1) + Tfav \times (j-1) + TA(j+1) + TB(j+1) + TB \times (j-1) + Tf \times 2$$

Furthermore, in FIG. 16, when it is assumed that an audio data recording area and a video data recording area are arranged continuously, and the access time Tfav=0, the following equation is obtained.

$$Tnv = Tfva \times j + (TA+TB) \times (j-1) + TA(j+1) + TB(j+1) + Tf \times 2$$

When the total amount of video data that is read out is taken as YV, and the bit rate of the video data is taken as VdV, a time until all of the video data that has been read out is consumed by the decoder is, $$YV/VdV.$$

If the value obtained by adding the reading out process times is shorter than this time, the buffer for video data does not become empty during the reproduction, and thus if $YV/VdV \geq Tsv + Tnv$ is satisfied, it is possible to perform reproduction while video does not stop. Since Tsv and Tnv in the right side of the formula are formulas using j, the value of j that satisfies this condition formula corresponds to the number of recording areas that are read out in succession during the reproduction.

Furthermore, the order of reproduction of this embodiment is characterized also in that after the data of another kind and the audio data in ch1 and ch2 in the recording area G10 in FIG. 16 are read out, without reading out video data in the directly following recording area G11 first, a point midway in the recording area G50, which includes audio data in the separate area (additional sequence) is accessed, and the audio data in ch3 and ch4 in the separate area (additional sequence) are read out first.

The reason for this will be described below. Since video data generally has a larger data size than audio data for the same length of time, video data requires a longer time for reading out data from a recording medium. In a reproduction process, it is necessary to output video and audio in synchronization, and thus data that is read out from the recording medium can be output as video and audio when not only video data but also audio data for necessary audio channels are all prepared. Herein, the case will be examined in which reproduction is performed in a different order from that in this embodiment. In FIG. 16, it is assumed that area from the recording area G10, the recording areas G11, G12, G13, G20, G21, G22 are read out first in this order. At this time point, only video data, data of another kind, audio data in ch1 and ch2 have been read out. Thus, video and audio cannot be output at this time point because the remaining audio data in ch3 and ch4 have not been prepared. With respect to the remaining audio data in ch3 and ch4, video and audio for four channels can be output simultaneously when the recording area G50 is further read out. It takes time to read out data in the recording areas G10 to G22 because video data is included in the areas. On the other hand, in the order of reproduction of this embodiment, after the recording area G10 in the main sequence is read out, the recording areas G50 to G60 in the additional sequence are read out first. Therefore, at this time point, the audio data in ch1 and ch2 in the recording area G10 are in the buffer, and the audio data in ch3 and ch4 in the recording areas G50 and G60 are also in the buffer. Thus, at the time point when the video data in the recording area G11 is read out, video data and audio data for four channels are prepared, and thus video and audio can be output. The recording areas G50 to G60 include audio data, and thus a time necessary for reading out the data is short. Thus, according to the order of reproduction of this embodiment, an effect is achieved that an output of video and audio can be started faster in reproduction processes.

Furthermore, during a period in which data is read out and output as video or audio, a memory, such as a buffer, for storing the read-out data is necessary. In the case where video data is read out first as described above by a different method from this embodiment, it is necessary to store video data that has been read out first until audio data for four channels are prepared. Since video data generally has a larger data size than audio data for the same length of time, a buffer with a large size is necessary to store video data. According to the order of reproduction of this embodiment, audio data is read out before video data. Therefore, it is sufficient that audio data whose size is smaller than video data is stored, and thus an effect is achieved that the buffer size for storing read out data is small.

INDUSTRIAL APPLICABILITY

According to the present invention, one cycle is constituted by processes of reproducing M pairs of audio data and video data are reproduced, and then recording M sets of audio data in post-recording. Thus, an effect is achieved that it is possible to perform post-record editing on a disk on which post-record editing has been impossible to perform by conventional methods, and the present invention is useful for a recording/reproduction device that can perform post-record editing and recording on an information recording medium and that can perform reproduction from the information recording medium on which post-record editing and recording have been performed.

The invention claimed is:

1. A recording/reproduction device for an information recording medium on which video data and audio data are recorded independently of each other,
   wherein on the information recording medium, in a separate area from a main sequence in which data blocks including original audio data and video data are recorded in succession, an additional sequence in which data blocks including post-record audio data are recorded in succession is formed,
   the recording/reproduction device comprising:
      a pick-up for recording or reproducing information onto/from the information recording medium, and
      a control portion for controlling an operation of the pick-up,
      wherein during reproduction from the information recording medium, the control portion controls an operation of the pick-up in the following order of (1) to (4), when M (M is an integer of 2 or larger) data blocks in the main sequence and M data blocks in the additional sequence, corresponding to each other in a real-time, are read out from the main sequence and the additional sequence, respectively, (1) from a head data block of the M data blocks in the main sequence, only original audio data of the head data block are read out with video data of the head data block not read out, (2) post-record audio data are read out in succession from the M data blocks in the additional sequence that correspond to the M data blocks in the main sequence, (3) video data are read out from the head data block of the main sequence, and (4) original audio data and video data are read out from remaining (M−1) data blocks in the main sequence.

2. The recording/reproduction device according to claim 1, wherein when a total amount of video data that is read out from (M+1) data blocks is taken as YV, a bit rate of the video data is taken as VdV, a time necessary for reading out the video data from the (M+1) data blocks is taken as Tsv, and a process time that is necessary for processes other than reading out of the video data during a period between a time when reading out of the video data from the first data block is started and a time when reading out of the video data from the (M+1)-th data block is ended in the (M+1) data blocks is taken as Tnv, $YV/VdV \geq Tsv+Tnv$ is satisfied.

* * * * *